(12) United States Patent
Ito et al.

(10) Patent No.: US 10,883,562 B2
(45) Date of Patent: Jan. 5, 2021

(54) DAMPER APPARATUS AND STARTING APPARATUS

(71) Applicant: AISIN AW CO., LTD., Anjo (JP)

(72) Inventors: Kazuyoshi Ito, Tsushima (JP); Masaki Wajima, Nagoya (JP); Kazuhiro Itou, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 121 days.

(21) Appl. No.: 16/076,919

(22) PCT Filed: Mar. 16, 2017

(86) PCT No.: PCT/JP2017/010740
§ 371 (c)(1),
(2) Date: Aug. 9, 2018

(87) PCT Pub. No.: WO2017/159808
PCT Pub. Date: Sep. 21, 2017

(65) Prior Publication Data
US 2019/0101180 A1  Apr. 4, 2019

(30) Foreign Application Priority Data
Mar. 16, 2016 (JP) ................................. 2016-052580

(51) Int. Cl.
*F16F 15/134* (2006.01)
*F16H 45/02* (2006.01)

(52) U.S. Cl.
CPC ...... *F16F 15/13484* (2013.01); *F16F 15/134* (2013.01); *F16H 45/02* (2013.01);
(Continued)

(58) Field of Classification Search
CPC ... F16F 15/134; F16F 15/13484; F16H 45/02; F16H 2045/0226; F16H 2045/0236
See application file for complete search history.

(56) References Cited

U.S. PATENT DOCUMENTS

| 2010/0096788 A1 | 4/2010 | Farahati et al. |
| 2014/0008174 A1* | 1/2014 | Tomiyama ................ F16D 3/14 192/203 |

(Continued)

FOREIGN PATENT DOCUMENTS

| DE | 10 2009 013 965 A1 | 9/2010 |
| JP | 2012-506006 A | 3/2012 |

(Continued)

OTHER PUBLICATIONS

Jun. 13, 2017 International Search Report issued in International Patent Application PCT/JP2017/010740.
(Continued)

*Primary Examiner* — Huan Le
(74) *Attorney, Agent, or Firm* — Oliff PLC

(57) ABSTRACT

A damper apparatus that includes an input to which a torque from an engine is transferred; an output; a first intermediate element; a second intermediate element; a first elastic body configured to transfer the torque between the input and the first intermediate element; a second elastic body configured to transfer the torque between the first intermediate element and the output; a third elastic body configured to transfer the torque between the input and the second intermediate element; a fourth elastic body configured to transfer the torque between the second intermediate element and the output; and a fifth elastic body configured to transfer the torque between the first intermediate element and the second intermediate element.

20 Claims, 11 Drawing Sheets

(52) U.S. Cl.
CPC ............... *F16H 2045/0226* (2013.01); *F16H 2045/0236* (2013.01)

(56) References Cited

U.S. PATENT DOCUMENTS

2015/0023781 A1* 1/2015 Takikawa ................ F16H 45/02
  415/119
2019/0178332 A1* 6/2019 Ito ........................... F16H 45/02

FOREIGN PATENT DOCUMENTS

| WO | 2013/161493 A1 | 10/2013 |
| WO | 2014/119686 A1 | 8/2014 |
| WO | 2016/021668 A1 | 2/2016 |
| WO | 2016/027846 A1 | 2/2016 |

OTHER PUBLICATIONS

Jun. 6, 2017 International Search Report issued in International Patent Application PCT/JP2017/010633.
U.S. Appl. No. 161078,117, filed Aug. 21, 2018 in the name of Ito et al.

* cited by examiner

DAMPER APPARATUS AND STARTING APPARATUS

BACKGROUND

The disclosure disclosed herein relates to a damper apparatus including an input element to which a torque from an engine is transferred, and an output element, and also relates to a starting apparatus including a pump impeller, a turbine runner, and the damper apparatus.

Hitherto, a double path damper for use in conjunction with a torque converter is known as a damper apparatus applicable to a starting apparatus (see, for example, JP 2012-506006 A). In this damper apparatus, a vibration path ranging from an engine and a lock-up clutch (32) to an output hub (37, 39) is divided into two parallel vibration paths B and C. Each of the two vibration paths B and C includes a pair of springs, and a separate intermediate flange (36, 38) disposed between the pair of springs. A turbine (34) of the torque converter is coupled to the intermediate flange (36) of the vibration path B in order to vary the natural frequencies of the two vibration paths. The natural frequency of the intermediate flange (36) of the vibration path B is smaller than the natural frequency of the intermediate flange (38) of the vibration path C. In this damper apparatus, when the lock-up clutch (32) is connected, a vibration from the engine enters the two vibration paths B and C of the damper apparatus. When the engine vibration having a certain frequency reaches the vibration path B including the intermediate flange (36) coupled to the turbine (34), the phase of the vibration in a range from the intermediate flange (36) of the vibration path B to the output hub (37, 39) deviates by 180 degrees from the phase of the input vibration. At this time, the vibration that enters the vibration path C is transferred to the output hub (37, 39) without causing a phase shift (deviation) because the natural frequency of the intermediate flange (38) of the vibration path C is larger than the natural frequency of the intermediate flange (36) of the vibration path B. Thus, the vibration at the output hub (37, 39) can be damped by causing the deviation by 180 degrees between the phase of the vibration transferred from the vibration path B to the output hub (37, 39) and the phase of the vibration transferred from the vibration path C to the output hub (37, 39).

SUMMARY

In order to improve the vibration damping performance of the double path damper disclosed in JP 2012-506006 A above, it is necessary to appropriately set the natural frequencies of the vibration paths B and C by adjusting the spring rates of elastic bodies on both sides of each intermediate flange and the weight of each intermediate flange. When an attempt is made to appropriately set the natural frequencies of the vibration paths B and C by adjusting the spring rates of the elastic bodies, however, the stiffness of the entire double path damper fluctuates significantly. When an attempt is made to appropriately set the two natural frequencies by adjusting the weight of the intermediate flange and the weight of the turbine coupled to the intermediate flange, the weights of the flange and the turbine and furthermore the weight of the entire torque converter increase. Thus, in the double path damper described above, it is not easy to appropriately set the natural frequencies of the vibration paths B and C so as to improve the vibration damping performance. Depending on the frequency of the vibration to be damped, the vibration cannot satisfactorily be damped even by the damper apparatus disclosed in JP 2012-506006 A.

An exemplary aspect of the disclosure provides a damper apparatus and a starting apparatus in which natural frequencies can be set easily and appropriately and the vibration damping performance can further be improved.

A damper apparatus disclosed includes an input to which a torque from an engine is transferred, an output, a first intermediate element, a second intermediate element, a first elastic body configured to transfer the torque between the input and the first intermediate element, a second elastic body configured to transfer the torque between the first intermediate element and the output, a third elastic body configured to transfer the torque between the input and the second intermediate element, a fourth elastic body configured to transfer the torque between the second intermediate element and the output, and a fifth elastic body configured to transfer the torque between the first intermediate element and the second intermediate element. The third and fourth elastic bodies are disposed on an outer side of the first and second elastic bodies in a radial direction of the damper apparatus. The fifth elastic body is disposed on the outer side of the first and second elastic bodies in the radial direction with a distance from the third and fourth elastic bodies in an axial direction of the damper apparatus, and at least partially overlaps the third and fourth elastic bodies in the radial direction as viewed in the axial direction.

In the damper apparatus, two natural frequencies can be set as a whole in a state in which deflections of all of the first to fifth elastic bodies are permitted. The two natural frequencies are appropriately set by adjusting the stiffness of the fifth elastic body. Thus, the vibration damping performance of the damper apparatus can be improved. The fifth elastic body is disposed on the outer side of the first and second elastic bodies in the radial direction with a distance from the third and fourth elastic bodies in the axial direction of the damper apparatus, and at least partially overlaps the third and fourth elastic bodies in the radial direction of the damper apparatus as viewed in the axial direction. Therefore, the degrees of freedom in terms of setting of the stiffnesses, the numbers of arrangement, the torsion angles (strokes), and the like of the first to fifth elastic bodies are increased. Thus, the two natural frequencies described above can be set easily and appropriately, and accordingly the vibration damping performance can further be improved.

DETAILED DESCRIPTION OF EMBODIMENTS

Next, modes for carrying out the disclosure disclosed herein are described with reference to the drawings.

Figure 1:
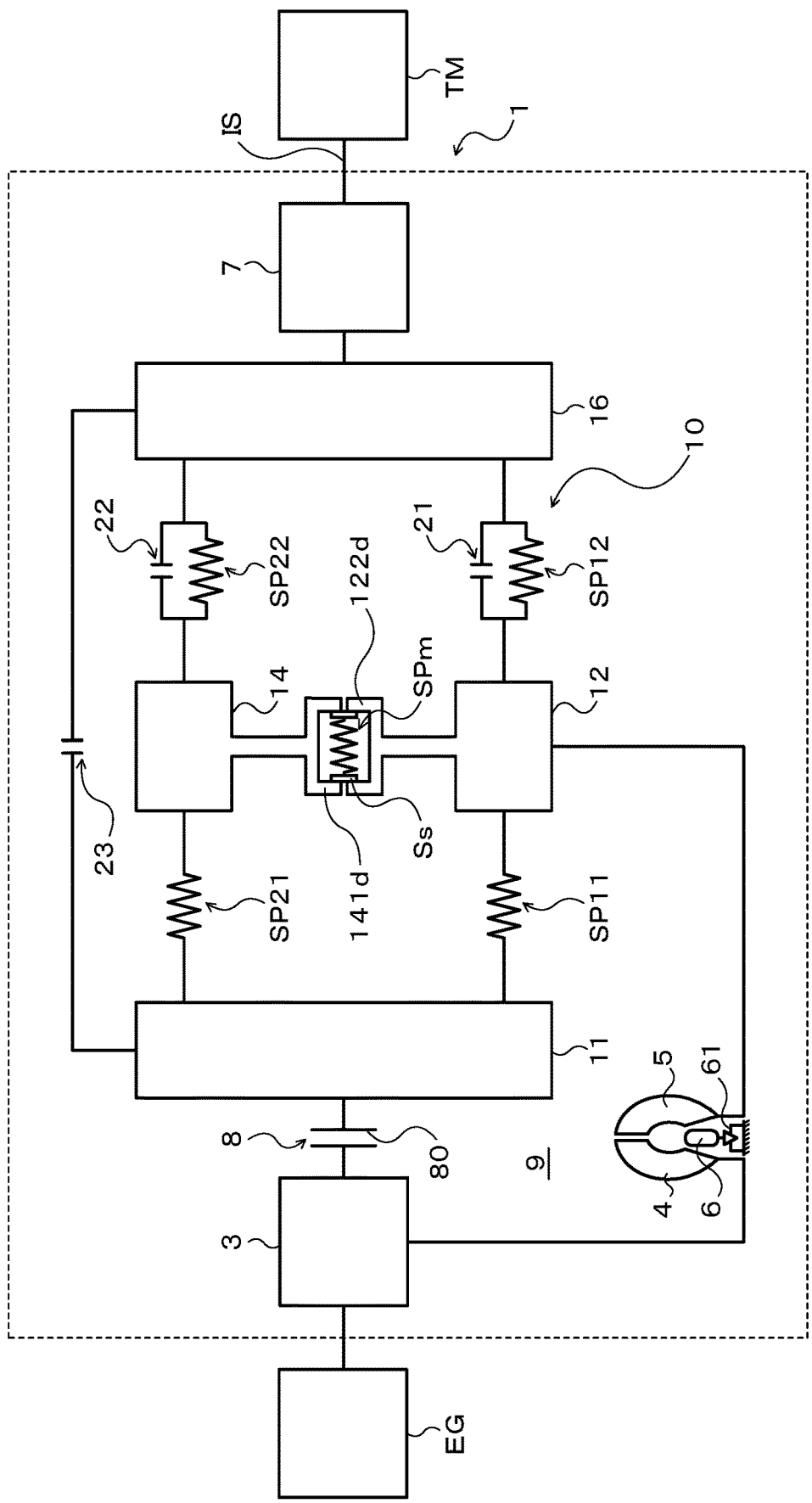
FIG. 1 is a schematic structural diagram illustrating a starting apparatus disclosed herein.
Figure 2:
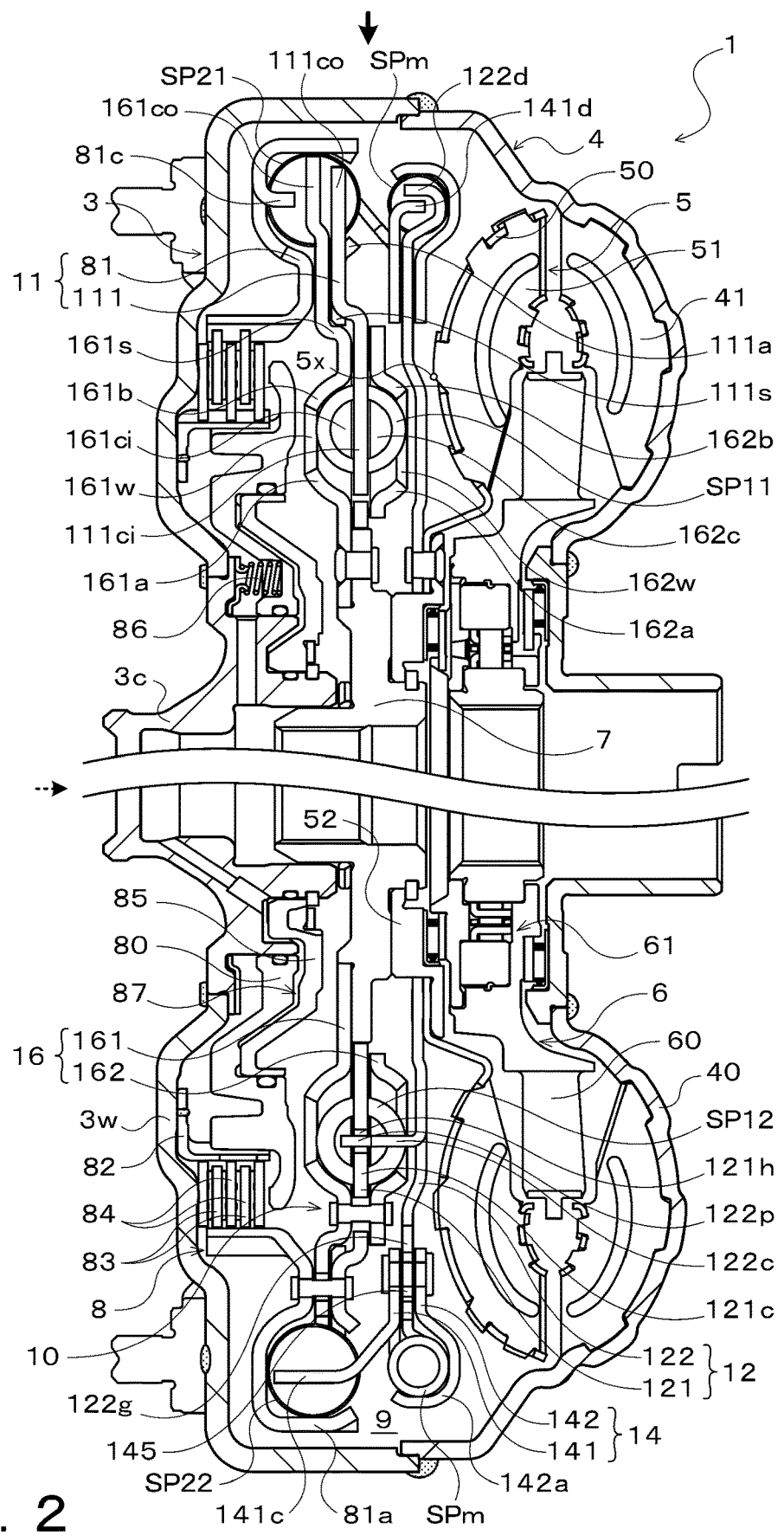
FIG. 2 is a sectional view illustrating the starting apparatus of FIG. 1.

FIG. 1 is a schematic structural diagram illustrating a starting apparatus 1 including a damper apparatus 10 disclosed herein. FIG. 2 is a sectional view illustrating the damper apparatus 10. The starting apparatus 1 illustrated in FIG. 1 is mounted on a vehicle including an engine (internal combustion engine in this embodiment) EG serving as a motor. In addition to the damper apparatus 10, the starting apparatus 1 includes a front cover 3 coupled to a crankshaft of the engine EG, a pump impeller (input-side fluid transmission element) 4 fixed to the front cover 3, a turbine runner (output-side fluid transmission element) 5 rotatable coaxially with the pump impeller 4, a damper hub 7 serving as a power output member coupled to the damper apparatus 10 and fixed to an input shaft IS of a transmission (power transfer apparatus) TM that is an automatic transmission (AT), a continuously variable transmission (CVT), a dual clutch transmission (DCT), a hybrid transmission, or a speed reducer, a lock-up clutch 8, and the like.

In the following description, an "axial direction" is basically an extending direction of a central axis CA (axis center; see FIG. 3) of the starting apparatus 1 and the damper apparatus 10 unless otherwise specified. A "radial direction" is basically a radial direction of the starting apparatus 1, the damper apparatus 10, and rotational elements of the damper apparatus 10 and the like, that is, an extending direction of a straight line extending from the central axis CA of the starting apparatus 1 and the damper apparatus 10 in a direction orthogonal to the central axis CA (direction of a radius) unless otherwise specified. A "circumferential direction" is basically a circumferential direction of the starting apparatus 1, the damper apparatus 10, and the rotational elements of the damper apparatus 10 and the like, that is, a direction along a rotation direction of the rotational elements unless otherwise specified.

The pump impeller 4 includes a pump shell 40 closely fixed to the front cover 3, and a plurality of pump blades 41 disposed on the inner surface of the pump shell 40. The turbine runner 5 includes a turbine shell 50 (see FIG. 2), and a plurality of turbine blades 51 disposed on the inner surface of the turbine shell 50. The inner peripheral portion of the turbine shell 50 is fixed to a turbine hub 52 via a plurality of rivets, and the turbine hub 52 is supported by the damper hub 7 in a freely rotatable manner. Movement of the turbine hub 52 (turbine runner 5) in the axial direction of the starting apparatus 1 is restricted by the damper hub 7 and a snap ring attached to the damper hub 7.

The pump impeller 4 and the turbine runner 5 face each other. A stator 6 configured to adjust a flow of hydraulic oil (fluid) from the turbine runner 5 to the pump impeller 4 is coaxially disposed between the pump impeller 4 and the turbine runner 5. The stator 6 includes a plurality of stator blades 60. The rotation direction of the stator 6 is set only to one direction by a one-way clutch 61. The pump impeller 4, the turbine runner 5, and the stator 6 form a torus (toric flow path) configured to circulate the hydraulic oil, and function as a torque converter (fluid transmission apparatus) having a torque amplifying function. In the starting apparatus 1, the stator 6 and the one-way clutch 61 may be omitted, and the pump impeller 4 and the turbine runner 5 may function as a fluid coupling.

The lock-up clutch 8 is a multi-plate hydraulic clutch, which executes lock-up for coupling the front cover 3 and the damper hub 7 to each other via the damper apparatus 10 and terminates the lock-up. The lock-up clutch 8 includes a lock-up piston 80 supported by a center piece 3c fixed to the front cover 3 so as to be movable in the axial direction, a clutch drum 81, an annular clutch hub 82 fixed to the inner surface of a lateral wall portion 3w of the front cover 3 so as to face the lock-up piston 80, a plurality of first friction engagement plates (friction plates having friction materials on both sides) 83 fitted to splines formed on the inner periphery of the clutch drum 81, and a plurality of second friction engagement plates 84 (separator plates) fitted to splined formed on the outer periphery of the clutch hub 82.

The lock-up clutch 8 further includes an annular flange member (oil chamber defining member) 85 attached to the center piece 3c of the front cover 3 so as to be located opposite to the lock-up piston 80 from the front cover 3 with respect, that is, located closer to the damper apparatus 10 and the turbine runner 5 than the lock-up piston 80, and a plurality of return springs 86 disposed between the front cover 3 and the lock-up piston 80. As in the illustration, the lock-up piston 80 and the flange member 85 define an engagement oil chamber 87, and hydraulic oil (engagement hydraulic pressure) is supplied from an unillustrated hydraulic controller to the engagement oil chamber 87. By increasing the engagement hydraulic pressure for the engagement oil chamber 87, the lock-up piston 80 is moved in the axial direction so as to press the first and second friction engagement plates 83 and 84 toward the front cover 3. Thus, the lock-up clutch 8 can be engaged (complete engagement or slip engagement).

The damper apparatus 10 damps vibrations between the engine EG and the transmission TM. As illustrated in FIG. 1, the damper apparatus 10 includes a driving member (input element) 11, a first intermediate member (first intermediate element) 12, a second intermediate member (second intermediate element) 14, and a driven member (output element) 16 as rotational elements (rotational members, that is, rotational masses) configured to coaxially rotate relative to each other. The damper apparatus 10 further includes, as torque transfer elements (torque transfer elastic bodies), a plurality of (for example, three in this embodiment) first inner springs (first elastic bodies) SP11 disposed between the driving member 11 and the first intermediate member 12 and configured to transfer a rotational torque (torque in the rotation direction), a plurality of (for example, three in this embodiment) second inner springs (second elastic bodies) SP12 disposed between the first intermediate member 12 and the driven member 16 and configured to transfer the rotational torque, a plurality of (for example, three in this embodiment) first outer springs (third elastic bodies) SP21 disposed between the driving member 11 and the second intermediate member 14 and configured to transfer the rotational torque, a plurality of (for example, three in this embodiment) second outer springs (fourth elastic bodies) SP22 disposed between the second intermediate member 14 and the driven member 16 and configured to transfer the rotational torque, and a plurality of (for example, three or six in this embodiment) intermediate springs (fifth elastic bodies) SPm disposed between the first intermediate member 12 and the second intermediate member 14 and configured to transfer the rotational torque.

In this embodiment, a linear coil spring formed of a metal material that is helically would so as to have an axis center extending straight when no load is applied is employed as each of the first and second inner springs SP11 and SP12, the first and second outer springs SP21 and SP22, and the intermediate springs SPm. Thus, each of the springs SP11 to SPm is extended and contracted along the axis center more appropriately than in a case where an arc coil spring is used. Accordingly, it is possible to reduce a hysteresis caused by a frictional force generated between the spring that transfers the torque and the rotational element, that is, a difference between a torque output when the torque input to the driving member 11 increases and a torque output when the torque input to the driving member 11 decreases. The hysteresis may be quantified by a difference between a torque output from the driven member 16 when the torsion angle of the damper apparatus 10 is a predetermined angle in a state in which the torque input to the driving member 11 increases and a torque output from the driven member 16 when the torsion angle of the damper apparatus 10 is the predetermined angle in a state in which the torque input to the driving member 11 decreases. At least one of the springs SP11 to SPm may be an arc coil spring.

In this embodiment, the first and second inner springs SP11 and SP12 are disposed in a fluid chamber 9 defined by the front cover 3 and the pump shell 40 of the pump impeller 4 so as to be alternately arranged along the circumferential direction of the damper apparatus 10 (first intermediate member 12). The first and second outer springs SP21 and SP22 are disposed in an outer peripheral region of the fluid chamber 9 so as to be alternately arranged along the circumferential direction of the damper apparatus 10 (second intermediate member 14). That is, the first and second outer springs SP21 and SP22 are disposed on a radially outer side of the first and second inner springs SP11 and SP12 so as to be close to the outer periphery of the starting apparatus 1.

Figure 3:
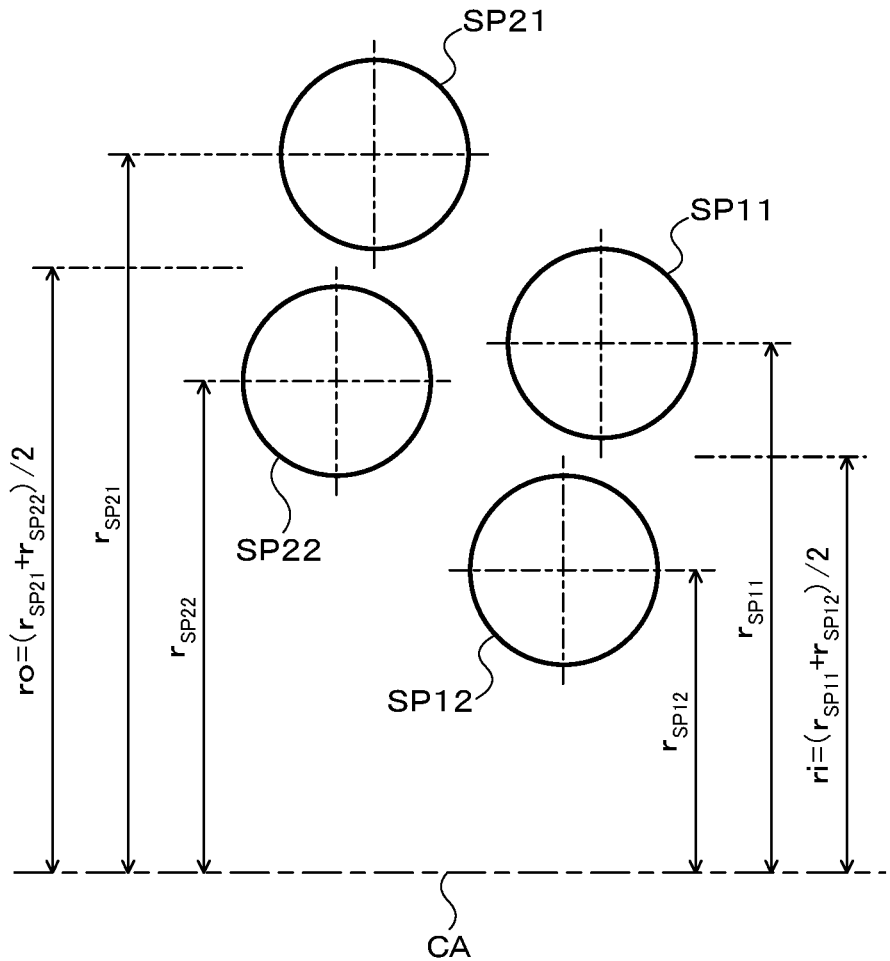
FIG. 3 is a schematic diagram for describing average attachment radii of first to fourth elastic bodies of a damper apparatus disclosed herein that is included in the starting apparatus of FIG. 1 and FIG. 2.

Thus, in the damper apparatus 10, an average attachment radius ro of the first and second outer springs SP21 and SP22 is larger than an average attachment radius ri of the first and second inner springs SP11 and SP12. As illustrated in FIG. 3, the average attachment radius ro of the first and second outer springs SP21 and SP22 is an average ($=(r_{SP21}+r_{SP22})/2$) of an attachment radius $r_{SP21}$ of the first outer spring (third elastic body) SP21 that is a distance from the central axis CA of the damper apparatus 10 to the axis center of the first outer spring SP21 and an attachment radius $r_{SP22}$ of the second outer spring (fourth elastic body) SP22 that is a distance from the central axis CA to the axis center of the second outer spring SP22. As illustrated in FIG. 3, the average attachment radius ri of the first and second inner springs SP11 and SP12 is an average ($=(r_{SP11}+r_{SP12})/2$) of an attachment radius $r_{SP11}$ of the first inner spring (first elastic body) SP11 that is a distance from the central axis CA to the axis center of the first inner spring SP11 and an attachment radius $r_{SP12}$ of the second inner spring (second elastic body) SP12 that is a distance from the central axis CA to the axis center of the second inner spring SP12. The attachment radius $r_{SP11}$, $r_{SP12}$, $r_{SP21}$, or $r_{SP22}$ may be a distance between the central axis CA and a predetermined point on the axis center of each spring SP11, SP12, SP21, or SP22 (for example, a center or end in the axial direction).

In this embodiment, the first and second outer springs SP21 and SP22 (and the intermediate springs SPm) are arranged on the same circumference (first circumference) so that the attachment radius $r_{SP21}$ and the attachment radius $r_{SP22}$ are equal to each other, and the axis center of the first outer spring SP21 and the axis center of the second outer spring SP22 are included in one plane orthogonal to the central axis CA. In this embodiment, the first and second inner springs SP11 and SP12 are arranged on the same circumference (second circumference having a diameter larger than that of the first circumference) so that the attachment radius $r_{SP11}$ and the attachment radius $r_{SP12}$ are equal to each other, and the axis center of the first inner spring SP11 and the axis center of the second inner spring SP12 are included in one plane orthogonal to the central axis CA. In addition, in the damper apparatus 10, the first and second inner springs SP11 and SP12 are disposed on a radially inner side of the first and second outer springs SP21 and SP22 so as to overlap the first and second outer springs SP21 and SP22 in the axial direction as viewed in the radial direction. Thus, the damper apparatus 10 can be made compact in the radial direction, and the axial length of the damper apparatus 10 can further be reduced.

As illustrated in FIG. 3, the attachment radius $r_{SP21}$ from the central axis CA to the axis center of the first outer spring SP21 and the attachment radius $r_{SP22}$ from the central axis CA to the axis center of the second outer spring SP22 may be different from each other. The attachment radius $r_{SP11}$ from the central axis CA to the axis center of the first inner spring SP11 and the attachment radius $r_{SP12}$ from the central axis CA to the axis center of the second inner spring SP12 may be different from each other. That is, the attachment radius $r_{SP21}$ or $r_{SP22}$ of at least one of the first and second outer springs SP21 and SP22 may be larger than the attachment radius $r_{SP11}$ or $r_{SP12}$ of at least one of the first and second inner springs SP11 and SP12. The axis center of the first outer spring SP21 and the axis center of the second outer spring SP22 need not be included in one plane orthogonal to the central axis CA. The axis center of the first inner spring SP11 and the axis center of the second inner spring SP12 need not be included in one plane orthogonal to the central axis CA. The axis centers of the springs SP11, SP12, SP21, and SP22 may be included in one plane orthogonal to the central axis CA. The axis center of at least one of the springs SP11, SP12, SP21, and SP22 need not be included in the one plane.

In this embodiment, when "$k_{11}$" represents a stiffness, that is, a spring rate of the first inner spring SP11, "$k_{12}$" represents a stiffness, that is, a spring rate of the second inner spring SP12, "$k_{21}$" represents a stiffness, that is, a spring rate of the first outer spring SP21, and "$k_{22}$" represents a stiffness, that is, a spring rate of the second outer spring SP22, the spring rates $k_{11}$, $k_{12}$, $k_{21}$, and $k_{22}$ are selected so as to satisfy relationships of $k_{11} \neq k_{21}$ and $k_{11}/k_{21} \neq k_{12}/k_{22}$. More specifically, the spring rates $k_{11}$, $k_{12}$, $k_{21}$, and $k_{22}$ satisfy relationships of $k_{11}/k_{21} < k_{12}/k_{22}$ and $k_{11} < k_{12} < k_{22} < k_{21}$. That is, a smaller one ($k_{11}$) of the spring rates $k_{11}$ and $k_{12}$ of the first and second inner springs SP11 and SP12 is smaller than a smaller one ($k_{22}$) of the spring rates $k_{21}$ and $k_{22}$ of the first and second outer springs SP21 and SP22. When "$k_m$" represents a stiffness, that is, a spring rate of the intermediate spring SPm, the spring rates $k_{11}$, $k_{12}$, $k_{21}$, $k_{22}$, and $k_m$ satisfy a relationship of $k_{11} < k_m < k_{12} < k_{22} < k_{21}$.

As illustrated in FIG. 2, the driving member 11 includes the clutch drum 81 (first input member) of the lock-up clutch 8 described above to which a torque from the engine EG is transferred, and an annular input plate 111 (second input member) coupled (fixed) to the clutch drum 81 side by side in the axial direction via a plurality of rivets. Thus, the front cover 3 (engine EG) and the driving member 11 of the damper apparatus 10 are coupled to each other through the engagement of the lock-up clutch 8. The clutch drum 81 includes an annular spring support portion 81a formed on a radially outer side with respect to the splines described above, and a plurality of (for example, three in this embodiment) spring abutment portions (elastic body abutment portions) 81c each extending in the axial direction. The spring support portion 81a is formed so as to support (guide) outer portions of the plurality of first and second outer springs SP21 and SP22 in the radial direction, front-cover-3-side (engine side) lateral portions (lateral portions on the left side in FIG. 2) thereof, inner sides of the lateral portions in the radial direction, and outer sides (shoulder portions) of turbine-runner-5-side (transmission side) lateral portions thereof in the radial direction. The clutch drum 81 is disposed in the fluid chamber 9 so that the spring support portion 81a is close to the outer periphery of the starting apparatus 1.

The input plate 111 is a plate-shaped annular member including a plurality of (for example, three in this embodiment) spring support portions 111a, a plurality of (for example, three in this embodiment) outer spring abutment portions (elastic body abutment portions) 111co, and a plurality of (for example, three in this embodiment) inner spring abutment portions (elastic body abutment portions) 111ci. The plurality of spring support portions 111a are formed on an outer peripheral portion of the input plate 111 at intervals (at regular intervals) in the circumferential direction. Every single inner spring abutment portion 111ci is provided between the spring support portions 111a adjacent to each other along the circumferential direction. The inner spring abutment portions 111ci extend radially inward from an inner peripheral portion of the input plate 111 at intervals (at regular intervals) in the circumferential direction. In this embodiment, the plurality of inner spring abutment portions 111ci are offset in the axial direction of the damper apparatus 10 so as to be closer to the turbine runner 5 than the plurality of outer spring abutment portions 111co.

As illustrated in FIG. 2, the first intermediate member 12 includes an annular first plate member 121 supported (aligned) by the damper hub 7 in a freely rotatable manner, and an annular second plate member 122 coupled (fixed) to the turbine runner 5 that is a mass so as to rotate together with the turbine runner 5. The first plate member 121 of the first intermediate member 12 includes a plurality of (for example, three in this embodiment) spring abutment portions 121c that protrude radially outward at intervals (at regular intervals) in the circumferential direction. As illustrated in FIG. 2, a rectangular or elongated hole-shaped opening portion 121h extending through each spring abutment portion 121c is formed in the spring abutment portion 121c.

The second plate member 122 of the first intermediate member 12 includes a plurality of (for example, three in this embodiment) coupling abutment portions (first abutment portions) 122c, and a plurality of (for example, six in this embodiment) outer abutment portions (second abutment portions) 122d disposed on a radially outer side with respect to the coupling abutment portions 122c. As in the illustration, the inner peripheral portion of the second plate member 122 is fixed to the turbine hub 52 together with the turbine shell 50 of the turbine runner 5. The coupling abutment portions 122c extend in the axial direction from a body of the second plate member 122 at intervals (at regular intervals) in the circumferential direction. A protruding portion 122p fitted to the opening portion 121h of the first plate member 121 is formed at the distal end of each coupling abutment portion 122c. The protruding portion 122p has a width slightly smaller than the width of the opening portion 121h of the first intermediate member 12 in the circumferential direction, and also has a thickness sufficiently smaller than the length of the opening portion 121h (opening length) of the first intermediate member 12 in the radial direction. The outer abutment portions 122d are formed symmetrically with respect to the axis center of the second plate member 122 so that every two (pair of) outer abutment portions 122d are close to each other. The two paired outer abutment portions 122d are arranged in the circumferential direction with a distance in accordance with, for example, the equilibrium length of the intermediate spring SPm. A plurality of circular are guide holes (elongated holes) 122g are formed in an outer peripheral portion of the second plate member 122 at intervals (at regular intervals) in the circumferential direction.

The second intermediate member 14 includes a first annular member (first member) 141, and a second annular member (second member) 142 coupled (fixed) to the first annular member 141 side by side in the axial direction via a plurality of rivets. The second intermediate member 14 has a moment of inertia smaller than that of the first intermediate member 12. As illustrated in FIG. 2, spacers 145 each having a thickness slightly larger than that of the second plate member 122 of the first intermediate member 12 are disposed between the first and second annular members 141 and 142 in the axial direction. The first and second annular members 141 and 142 are fastened to each other with a plurality of rivets passing through the first and second annular members 141 and 142 and the spacers 145.

As illustrated in FIG. 2, the spacers 145 (and the rivets) are disposed in the guide holes 122g of the second plate member 122 of the first intermediate member 12. Thus, the second intermediate member 14 is supported by the second plate member 122 disposed between the first and second annular members 141 and 142 in the axial direction so as to be rotatable relative to the first intermediate member 12. By disposing the spacers 145 described above between the first and second annular members 141 and 142 in the axial direction, clearances are provided between the inner surfaces of the first and second annular members 141 and 142 and the surfaces of the second plate member 122. Thus, the second intermediate member 14 can smoothly be moved relative to the second plate member 122 (first intermediate member 12).

The first annular member 141 includes a plurality of (for example, three in this embodiment) first spring abutment portions (elastic body abutment portions) 141c, and a plurality of (for example, six in this embodiment) second spring abutment portions (elastic body abutment portions) 141d. The plurality of first spring abutment portions 141c extend from a body of the first annular member 141 to the radially outer side and to one side in the axial direction (left side in FIG. 2; front cover 3 side) at intervals in the circumferential direction. The plurality of second spring abutment portions 141d extend from the body of the first annular member 141 to the radially outer side and to the other side in the axial direction, that is, away from the first spring abutment portions 141c (right side in FIG. 2; turbine runner 5 side) at intervals in the circumferential direction. The second spring abutment portions 141d are formed symmetrically with respect to the axis center of the first annular member 141 so that every two (pair of) second spring abutment portions 141d are closer to each other. The two paired second spring abutment portions 141d are arranged in the circumferential direction with a distance in accordance with, for example, the equilibrium length of the intermediate spring SPm.

The second annular member 142 includes an annular spring support portion 142a. The spring support portion 142a is formed so as to support (guide) outer portions of the plurality of intermediate springs SPm in the radial direction, turbine-runner-side (transmission side) lateral portions (lateral portions on the right side in FIG. 2) thereof, inner sides of the lateral portions in the radial direction, and outer sides (shoulder portions) of front-cover-3-side (engine side) lateral portions thereof in the radial direction. The second annular member 142 may include a plurality of spring support portions 142a formed at intervals (at regular intervals) in the circumferential direction. In this case, it is appropriate that each of the plurality of spring support portions 142a be formed so as to have a circumferential length sufficiently larger than the circumferential length of the intermediate spring SPm.

The driven member 16 includes a first output plate (first output member) 161, and an annular second output plate (second output member) 162 disposed so as to be closer to the turbine runner 5 than the first output plate 161 and coupled (fixed) to the first output plate 161 side by side in the axial direction via a plurality of rivets. The first output plate 161 of the driven member 16 is a plate-shaped annular member, and the inner peripheral portion of the first output plate 161 is fixed to the damper hub 7 via a plurality of rivets. As in the illustration, the first output plate 161 includes a plurality of (for example, three) spring housing windows 161w disposed at intervals (at regular intervals) in the circumferential direction, a plurality of (for example, three) spring support portions 161a extending along the inner peripheral edges of the respective spring housing windows 161w, a plurality of (for example, three) spring support portions 161b extending along the outer peripheral edges of the respective spring housing windows 161w, a plurality of (for example, three) inner spring abutment portions 161ci, and a plurality of (for example, three) outer spring abutment portions 161co.

The plurality of inner spring abutment portions 161ci are provided so that every single inner spring abutment portion 161ci extends in the radial direction between the spring housing windows 161w (spring support portions 161a and 161b) adjacent to each other along the circumferential direction. The plurality of outer spring abutment portions 161co extend radially outward from an outer peripheral portion of the first output plate 161 at intervals (at regular intervals) in the circumferential direction. In this embodiment, the plurality of outer spring abutment portions 161co are offset in the axial direction of the damper apparatus 10 so as to be closer to the front cover 3 than the plurality of inner spring abutment portions 161ci. The first output plate 161 further includes a short tubular supporting portion 161s extending in the axial direction between the plurality of inner spring abutment portions 161ci and the plurality of outer spring abutment portions 161co in the radial direction.

The second output plate 162 of the driven member 16 is a plate-shaped annular member including a plurality of (for example, three) spring housing windows 162w disposed at intervals (at regular intervals) in the circumferential direction, a plurality of (for example, three) spring support portions 162a extending along the inner peripheral edges of the respective spring housing windows 162w, a plurality of (for example, three) spring support portions 162b extending along the outer peripheral edges of the respective spring housing windows 162w, and a plurality of (for example, three) spring abutment portions 162c. The plurality of spring abutment portions 162c are provided so that every single spring abutment portion 162c extends in the radial direction between the spring housing windows 162w (spring support portions 162a and 162b) adjacent to each other along the circumferential direction.

As illustrated in FIG. 2, the first and second output plates 161 and 162 are coupled to each other so that the associated spring support portions 161a and 162a face each other and the associated spring support portions 161b and 162b face each other. An inner peripheral half segment of the input plate 111 of the driving member 11 is disposed between the first and second output plates 161 and 162 in the axial direction, and a supported portion 111s formed on the input plate 111 is supported by the short tubular supporting portion 161s of the first output plate 161. Thus, the input plate 111 is supported (aligned) by the driven member 16 (first output plate 161) in a freely rotatable manner, and the outer spring abutment portions 111co of the input plate 111 extend radially outward over the supporting portion 161s.

The first plate member 121 of the first intermediate member 12 is disposed between the first and second output plates 161 and 162 so as to be surrounded by the annular portion of the input plate 111. The inner spring abutment portions 111ci of the input plate 111 and the spring abutment portions 121c of the first plate member 121 are arranged in the axial direction between the first and second output plates 161 and 162, and overlap each other in the axial direction (located substantially flush with each other) as viewed in the radial direction. The second plate member 122 of the first intermediate member 12 is fixed to the turbine hub 52 via a plurality of rivets so as to extend in the radial direction between the turbine runner 5 and the second output plate 162 in the axial direction. The second intermediate member 14 is supported by the second plate member 122, and is disposed in the outer peripheral region of the fluid chamber 9 so that the spring support portion 142a overlaps the spring support portion 81a of the clutch drum 81 in the radial direction of the damper apparatus 10 as viewed in the axial direction of the damper apparatus 10. The outer spring abutment portions 161co of the driven member 16 extend in the radial direction between the outer spring abutment portions 111co of the input plate 111 and the clutch drum 81 (spring abutment portions 81c) in the axial direction.

The first and second inner springs SP11 and SP12 are supported by the driven member 16, that is, the associated spring support portions 161a, 161b, 162a, and 162b of the first and second output plates 161 and 162 so that every single first inner spring SP11 and every single second inner spring SP12 are paired with each other (act in series) and the first and second inner springs SP11 and SP12 are alternately arranged in the circumferential direction (circumferential direction of the first intermediate member 12). That is, as illustrated in FIG. 2, the plurality of spring support portions 161a of the first output plate 161 support (guide), from an inner peripheral side, front-cover-3-side lateral portions of the respective first and second inner springs SP11 and SP12 (each spring support portion corresponds to one inner spring). The plurality of spring support portions 161b of the first output plate 161 support (guide), from an outer peripheral side, the front-cover-3-side lateral portions of the respective first and second inner springs SP11 and SP12 (each spring support portion corresponds to one inner spring). The plurality of spring support portions 162a of the second output plate 162 support (guide), from the inner peripheral side, the-turbine-runner-5-side lateral portions of the respective first and second inner springs SP11 and SP12 (each spring support portion corresponds to one inner spring). The plurality of spring support portions 162b of the second output plate 162 support (guide), from the outer peripheral side, the-turbine-runner-5-side lateral portions of the respective first and second inner springs SP11 and SP12 (each spring support portion corresponds to one inner spring).

In a state in which the damper apparatus 10 is attached, between the first and second inner springs SP11 and SP12 that are disposed in different spring housing windows 161w and 162w and are not paired with each other (do not act in series), the driving member 11, that is, each inner spring abutment portion 111ci of the input plate 111 abuts against the ends of those first and second inner springs SP11 and SP12. In the state in which the damper apparatus 10 is attached, between the first and second inner springs SP11 and SP12 that are not paired with each other (do not act in series), each inner spring abutment portion 161ci of the first output plate 161 abuts against the ends of those first and second inner springs SP11 and SP12 similarly to the inner spring abutment portion 111ci of the input plate 111. In the state in which the damper apparatus 10 is attached, between the first and second inner springs SP11 and SP12 that are not paired with each other (do not act in series), each spring abutment portion 162c of the second output plate 162 similarly abuts against the ends of those first and second inner springs SP11 and SP12.

Figure 4:
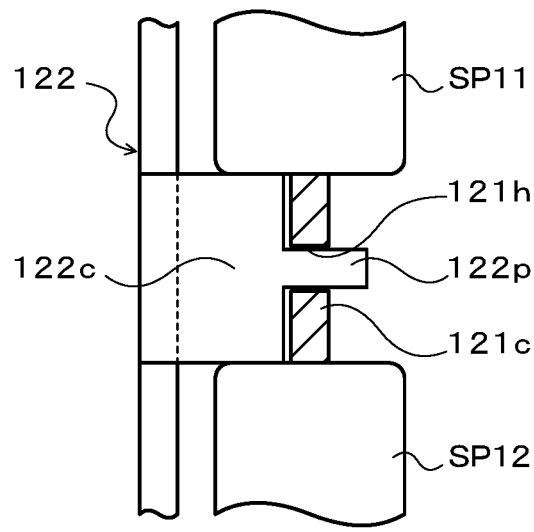
FIG. 4 is a schematic diagram illustrating a main part of the damper apparatus disclosed herein.
Figure 5:
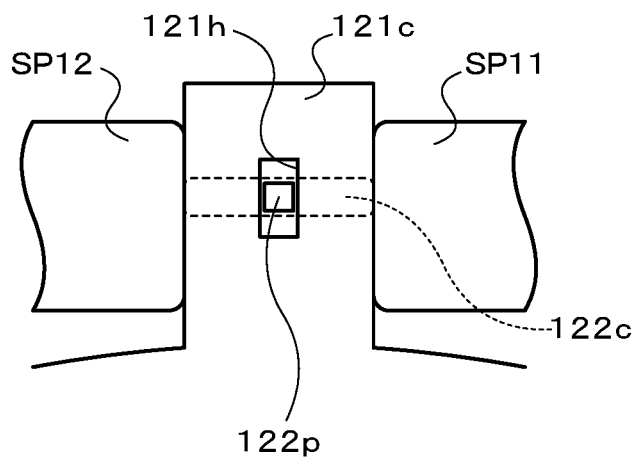
FIG. 5 is a schematic diagram illustrating a main part of the damper apparatus disclosed herein.

Each spring abutment portion 121c of the first plate member 121 of the first intermediate member 12 extends in the radial direction between the first and second inner springs SP11 and SP12 that are paired with each other (act in series), and abuts against the ends of those first and second inner springs SP11 and SP12. In this embodiment, as illustrated in FIG. 2, the protruding portion 122p of the coupling abutment portion 122c of the second plate member 122 is fitted (coupled) to the opening portion 121h of the spring abutment portion 121c of the first plate member 121. As illustrated in FIG. 4 and FIG. 5, each coupling abutment portion 122c extends in the axial direction between the first and second inner springs SP11 and SP12, and abuts against the ends of those first and second inner springs SP11 and SP12. That is, the lateral surfaces of each coupling abutment portion 122c on both sides in the circumferential direction each abut against the end of the first or second inner spring SP11 or SP12.

Thus, in the state in which the damper apparatus 10 is attached, one end of the first inner spring SP11 and the other end of the second inner spring SP12 that are not paired with the first inner spring SP11 abut against the associated inner spring abutment portions 111ci of the driving member 11 and the associated spring abutment portions 161ci and 162c of the driven member 16. In the state in which the damper apparatus 10 is attached, the other end of the first inner spring SP11 and one end of the second inner spring SP12 paired with the first inner spring SP11 abut against the first intermediate member 12, that is, the spring abutment portion 121c of the first plate member 121 and the coupling abutment portion 122c of the second plate member 122. As a result, the driven member 16 is coupled to the driving member 11 via the plurality of first inner springs SP11, the first intermediate member 12 (first plate member 121 and second plate member 122), and the plurality of second inner springs SP12.

The first and second outer springs SP21 and SP22 are supported by the driving member 11, that is, the spring support portion 81a of the clutch drum 81 and the spring support portions 111a of the input plate 111 so that every single first outer spring SP21 and every single second outer spring SP22 are paired with each other (act in series) and the first and second outer springs SP21 and SP22 are alternately arranged in the circumferential direction (circumferential direction of the second intermediate member 14). In the state in which the damper apparatus 10 is attached, between the first and second outer springs SP21 and SP22 that are not paired with each other (do not act in series), the driving member 11, that is, each of the spring abutment portion 81c of the clutch drum 81 and the outer spring abutment portion 111co of the input plate 111 abuts against the ends of those first and second outer springs SP21 and SP22. Each first spring abutment portion 141c of the first annular member 141 of the second intermediate member 14 is inserted into an opening defined between the spring support portion 81a and the input plate 111. Between the first and second outer springs SP21 and SP22 that are paired with each other (act in series), each first spring abutment portion 141c abuts against the ends of those first and second outer springs SP21 and SP22. In the state in which the damper apparatus 10 is attached, between the first and second outer springs SP21 and SP22 that are not paired with each other (do not act in series), each outer spring abutment portion 161co of the first output plate 161 abuts against the ends of those first and second outer springs SP21 and SP22.

Thus, in the state in which the damper apparatus 10 is attached, one end of the first outer spring SP21 and the other end of the second outer spring SP22 that are not paired with the first outer spring SP21 abut against the associated spring abutment portions 81c and 111co of the driving member 11 and the associated spring abutment portions 161co of the driven member 16. In the state in which the damper apparatus 10 is attached, the other end of the first outer spring SP21 and one end of the second outer spring SP22 paired with the first outer spring SP21 abut against the second intermediate member 14, that is, the first spring abutment portion 141c of the first annular member 141. As a result, the driven member 16 is coupled to the driving member 11 via the plurality of first outer springs SP21, the second intermediate member 14 (first annular member 141 and second annular member 142), and the plurality of second outer springs SP22.

The intermediate springs SPm are supported by the spring support portion 142a of the second annular member 142 of the second intermediate member 14. In the state in which the damper apparatus 10 is attached, a pair of outer abutment portions 122d of the second plate member 122 abut against the respective ends of the intermediate spring SPm, and a pair of second spring abutment portions 141d of the first annular member 141 abut against the respective ends of the intermediate spring SPm. Thus, in the state in which the damper apparatus 10 is attached, each intermediate spring SPm is supported from both sides in the circumferential direction by the first intermediate member 12, that is, the pair of outer abutment portions 122d of the second plate member 122, and is also supported from both sides in the circumferential direction by the second intermediate member 14, that is, the pair of second spring abutment portions 141d of the first annular member 141. Accordingly, the first intermediate member 12 and the second intermediate member 14 are coupled to each other via the plurality of intermediate springs SPm. As illustrated in FIG. 1, spring seats Ss each abutting against the outer abutment portion 122d or the second spring abutment portion 141d may be attached to the ends of the intermediate spring SPm.

As illustrated in FIG. 1, the damper apparatus 10 includes a first stopper 21 configured to restrict a relative rotation between the first intermediate member 12 and the driven member 16 and a deflection of the second inner springs SP12, a second stopper 22 configured to restrict a relative rotation between the second intermediate member 14 and the driven member 16 and a deflection of the second outer springs SP22, and a third stopper 23 configured to restrict a relative rotation between the driving member 11 and the driven member 16. The first and second stoppers 21 and 22 are structured to restrict the relative rotations between the respective rotational elements and the deflections of the springs substantially simultaneously in a phase in which the input torque transferred from the engine EG to the driving member 11 reaches a predetermined torque (first threshold) T1 smaller than a torque T2 (second threshold) corresponding to a maximum torsion angle θmax of the damper apparatus 10. The third stopper 23 is structured to restrict the relative rotation between the driving member 11 and the driven member 16 in a phase in which the torque input to the driving member 11 reaches the torque T2 corresponding to the maximum torsion angle θmax. Thus, the damper apparatus 10 has a two-phase (two-stage) damping characteristic. The arrangement positions of the plurality of stoppers in the damper apparatus 10 are not limited to the positions illustrated in FIG. 1. That is, the plurality of stoppers may be disposed at any positions as long as the stoppers can appropriately restrict the deflections of the first and second inner springs SP11 and SP12, the first and second outer springs SP21 and SP22, and the intermediate springs SPm.

In the damper apparatus 10 structured as described above, the average attachment radius ro of the first and second outer springs SP21 and SP22 having larger spring rates (higher stiffnesses) than the first and second inner springs SP11 and SP12 is defined so as to be larger than the average attachment radius ri of the first and second inner springs SP11 and SP12. Therefore, the torsion angles (strokes) of the first and second outer springs SP21 and SP22 can further be increased. Thus, the stiffnesses of the first and second outer springs SP21 and SP22 can be reduced while transfer of a large torque to the driving member 11 is permitted.

In the damper apparatus 10, the first outer springs SP21 (third elastic bodies) and the second outer springs SP22 (fourth elastic bodies) are disposed on the outer side of the first and second inner springs SP11 and SP12 in the radial direction of the damper apparatus 10. As illustrated in FIG. 2, the intermediate springs SPm are disposed on the outer side of the first and second inner springs SP11 and SP12 in the radial direction so as to be closer to the turbine runner 5 than the first and second inner springs SP11 and SP12 and the first and second outer springs SP21 and SP22 in the axial direction of the damper apparatus 10. That is, the intermediate springs SPm are disposed on the radially outer side of the first and second inner springs SP11 and SP12 with distances from the first and second outer springs SP21 and SP22 in the axial direction. Thus, it is possible to increase the degrees of freedom in terms of setting of the stiffnesses, the numbers of arrangement, the torsion angles (strokes), and the like of the first and second inner springs SP11 and SP12, the first and second outer springs SP21 and SP22, and the intermediate springs SPm.

According to the damper apparatus 10, an increase in the size of the starting apparatus 1 along with the arrangement of the intermediate springs SPm can be suppressed by effectively using the space. More specifically, the first and second outer springs SP21 and SP22 are disposed so as to partially overlap at least one of the first and second inner springs SP11 and SP12 in the axial direction of the damper apparatus 10 (see a dotted line arrow in FIG. 2) as viewed in the radial direction of the damper apparatus 10 (see a wide line arrow in FIG. 2). The intermediate springs SPm are disposed so as to partially overlap at least one of the first and second inner springs SP11 and SP12 in the axial direction as viewed in the radial direction. Thus, the axial length of the damper apparatus 10 and furthermore the axial length of the starting apparatus 1 can further be reduced. The intermediate springs SPm are disposed so as to partially overlap at least one of the first and second outer springs SP21 and SP22 in the radial direction as viewed in the axial direction. Thus, it is possible to increase the degrees of freedom in terms of setting of the spring rates $k_{21}$, $k_{22}$, and $k_m$, the numbers of arrangement, the torsion angles (strokes), and the like of the first and second outer springs SP21 and SP22 and the intermediate springs SPm.

The first and second outer springs SP21 and SP22 are disposed so as to partially overlap a part of the lock-up clutch 8 (for example, the clutch drum 81, the lock-up piston 80, the flange member 85, and the return spring 86) in the axial direction as viewed in the radial direction. Thus, the axial length of the damper apparatus 10 and furthermore the axial length of the starting apparatus 1 can further be reduced. In addition, the first and second inner springs SP11 and SP12 are disposed so as to partially overlap the friction engagement portions of the lock-up clutch 8, that is, the first and second friction engagement plates 83 and 84 in the radial direction as viewed in the axial direction, and the first and second outer springs SP21 and SP22 are disposed on the outer side in the radial direction with respect to the first and second friction engagement plates 83 and 84. Thus, the vibration damping performance of the damper apparatus 10 can further be improved by reducing the hysteresis of the first and second inner springs SP11 and SP12 while the axial length of the damper apparatus 10 and furthermore the axial length of the starting apparatus 1 are further reduced.

The first and second inner springs SP11 and SP12 are disposed on an inner side in the radial direction with respect to a maximally bulging portion 5x (see FIG. 2) of the turbine runner 5 in the axial direction, and the first and second outer springs SP21 and SP22 are disposed on an outer side in the radial direction with respect to the maximally bulging portion 5x of the turbine runner 5. Thus, the axial length of the damper apparatus 10 and furthermore the axial length of the starting apparatus 1 can further be reduced. In addition, the intermediate springs SPm are disposed so as to partially overlap the turbine runner 5 in the radial direction as viewed in the axial direction. Thus, the space usage of the entire starting apparatus 1 can be improved by effectively using, as an arrangement space for the intermediate springs SPm, the region in the vicinity of the outer peripheral portion of the turbine runner 5 that is likely to be a dead space.

In the damper apparatus 10, the second intermediate member 14 includes the first and second annular members 141 and 142. The second intermediate member 14 is supported by the second plate member 122 of the first intermediate member 12 so as to be rotatable relative to the first intermediate member 12. The second intermediate member 14 is disposed between the outer peripheral portion of the turbine runner 5 and the clutch drum 81 in the axial direction. The first spring abutment portions 141c each abutting against the ends of the first and second outer springs SP21 and SP22 between the first and second outer springs SP21 and SP22 and the second spring abutment portions 141d each abutting against the end of the intermediate spring SPm are both formed on the first annular member 141 on one side. The plurality of intermediate springs SPm are supported by the second annular member 142 on the other side. The first spring abutment portion 141c extends from the first annular member 141 to one side in the axial direction of the damper apparatus 10 so as to abut against the ends of the first and second outer springs SP21 and SP22. The second spring abutment portion 141d extends from the first annular member 141 to the other side in the axial direction so as to abut against the end of the intermediate spring SPm. Thus, the second intermediate member 14 can be coupled to the first and second outer springs SP21 and SP22 and the intermediate springs SPm while the increase in the size of the starting apparatus 1 along with the arrangement of the intermediate springs SPm is suppressed by effectively using the space in the starting apparatus 1.

In the damper apparatus 10, in addition to the spring abutment portion 121c of the first plate member 121, the coupling abutment portion 122c of the second plate member 122 that is fitted to the spring abutment portion 121c abuts against the ends of the first and second inner springs SP11 and SP12 between the first and second inner springs SP11 and SP12. By causing both of the spring abutment portion 121c extending in the radial direction of the damper apparatus 10 and the coupling abutment portion 122c extending in the axial direction of the damper apparatus 10 to abut against the first and second inner springs SP11 and SP12, the first and second inner springs SP11 and SP12 can appropriately be pressed by the first intermediate member 12 so as to extend and contract along the axis center. As a result, the vibration damping performance of the damper apparatus 10 can further be improved.

By causing the coupling abutment portion 122c fitted to the spring abutment portion 121c to abut against the ends of the first and second inner springs SP11 and SP12 between the first and second inner springs SP11 and SP12, the second plate member 122 can be supported from both sides in the circumferential direction by the first and second inner springs SP11 and SP12. Thus, the first plate member 121 and the second plate member 122 can loosely be fitted to each other, and the coupling abutment portion 122c can easily be fitted to the spring abutment portion 121c. That is, in the damper apparatus 10, as described above, the opening length of the opening portion 121h of the spring abutment portion 121c in the radial direction is defined as being larger than the thickness of the protruding portion 122p of the coupling abutment portion 122c in the radial direction. Thus, the protruding portion 122p of the coupling abutment portion 122c of the second plate member 122 can easily be fitted to the opening portion 121h of the spring abutment portion 121c of the first plate member 121. Accordingly, the assembling workability of the damper apparatus 10 can be secured satisfactorily.

The coupling abutment portion 122c of the second plate member 122 is retained by the first and second inner springs SP11 and SP12, and therefore the turbine runner 5 that is a mass and the turbine hub 52 are coupled to the first intermediate member 12. Thus, a substantial moment of inertia of the first intermediate member 12 (sum of the moments of inertia of the first and second plate members 121 and 122, the turbine runner 5, the turbine hub 52, and the like) can further be increased. In addition, by coupling the inner peripheral portion of the second plate member 122 to the turbine runner 5, the first intermediate member 12 and the turbine runner 5 can be coupled to each other while the mountability is improved by suppressing an increase in the size of the damper apparatus 10.

In the damper apparatus 10, as illustrated in FIG. 2, the inner and outer spring abutment portions 111ci and 111co of the driving member 11, the spring abutment portions 121c of the first intermediate member 12, and the inner spring abutment portions 161ci, the spring abutment portions 162c, and the outer spring abutment portions 161co of the driven member 16 extend in the radial direction of the damper apparatus 10. Thus, the associated spring SP11, SP12, SP21, or SP22 can be pressed by the spring abutment portion 111ci, 111co, 161ci, 162c, or 161co so as to appropriately extend and contract along the axis center. As a result, the vibration damping performance of the damper apparatus 10 can further be improved.

In the damper apparatus 10, the coupling abutment portions 122c each abutting against the ends of the first and second inner springs SP11 and SP12 between the first and second inner springs SP11 and SP12 and the outer abutment portions 122d each abutting against the end of the intermediate spring SPm are both formed on the second plate member 122 (single member) included in the first intermediate member 12. Further, the first spring abutment portions 141c each abutting against the ends of the first and second outer springs SP21 and SP22 between the first and second outer springs SP21 and SP22 and the second spring abutment portions 141d each abutting against the end of the intermediate spring SPm are both formed on the first annular member 141 (single member) included in the second intermediate member 14. Thus, an increase in the number of components and the increase in the size of the damper apparatus 10 can be suppressed.

Next, an operation of the damper apparatus 10 is described. In the starting apparatus 1, when the lock-up is not executed by the lock-up clutch 8, for example, a rotational torque (power) transferred from the engine EG to the front cover 3 is transferred to the input shaft IS of the transmission TM via a path including the pump impeller 4, the turbine runner 5, the first intermediate member 12, the second inner springs SP12, the driven member 16, and the damper hub 7 and via a path including the pump impeller 4, the turbine runner 5, the first intermediate member 12, the intermediate springs SPm, the second intermediate member 14, the second outer springs SP22, the driven member 16, and the damper hub 7. When the lock-up is executed by the lock-up clutch 8 of the starting apparatus 1, the rotational torque (input torque) transferred from the engine EG to the driving member 11 via the front cover 3 and the lock-up clutch 8 (lock-up piston 80) is transferred to the driven member 16 and the damper hub 7 via all the springs SP11 to SPm until the torque input to the driving member 11 reaches the torque T1 described above, that is, while the deflections of all of the first and second inner springs SP11 and SP12, the first and second outer springs SP21 and SP22, and the intermediate springs SPm are permitted.

Figure 6:
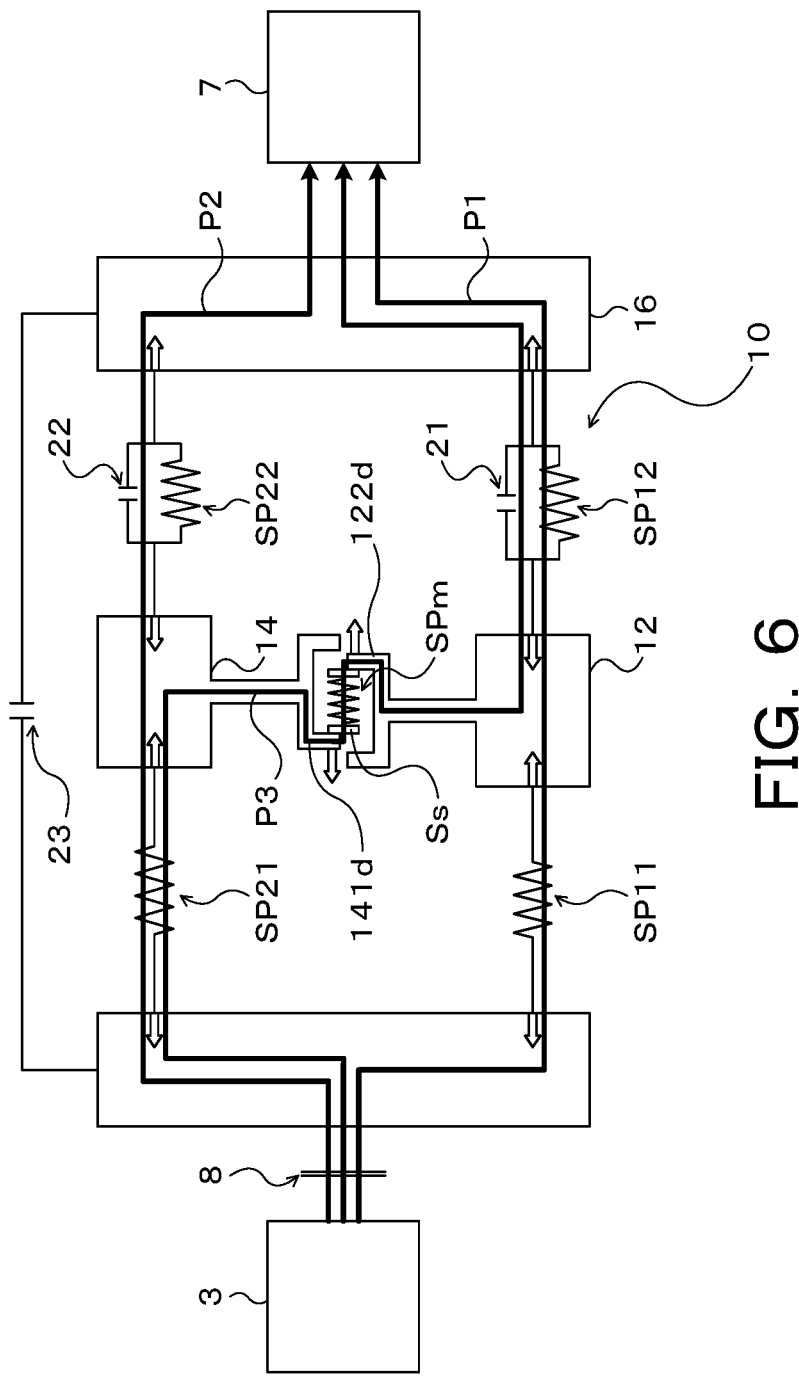
FIG. 6 is a schematic diagram illustrating torque transfer paths of the damper apparatus disclosed herein.

That is, until the input torque reaches the torque T1 during the execution of the lock-up, the first inner springs (first elastic bodies) SP11 transfer the rotational torque from the driving member 11 to the first intermediate member 12, and the second inner springs (second elastic bodies) SP12 transfer the rotational torque from the first intermediate member 12 to the driven member 16. Further, the first outer springs (third elastic bodies) SP21 transfer the rotational torque from the driving member 11 to the second intermediate member 14, and the second outer springs (fourth elastic bodies) SP22 transfer the rotational torque from the second intermediate member 14 to the driven member 16. Thus, as illustrated in FIG. 6, the damper apparatus 10 has a first torque transfer path P1 including the first inner springs SP11, the first intermediate member 12, and the second inner springs SP12, and a second torque transfer path P2 including the first outer springs SP21, the second intermediate member 14, and the second outer springs SP22 as torque transfer paths between the driving member 11 and the driven member 16.

In the damper apparatus 10, as described above, the spring rates $k_{11}$, $k_{12}$, $k_{21}$, and $k_{22}$ of the first and second inner springs SP11 and SP12 and the first and second outer springs SP21 and SP22 satisfy the relationship of $k_{11} < k_{12} < k_{22} < k_{21}$. Therefore, when the torque is transferred to the driving member 11 within a period until the input torque reaches the torque T1 during the execution of the lock-up, as illustrated in FIG. 6, the second intermediate member 14 is (slightly) twisted to an advancing side (downstream side) in the rotation direction (rotation direction when the vehicle travels forward) relative to the first intermediate member 12. Thus, each intermediate spring SPm is pressed toward one of the paired outer abutment portions 122d of the first intermediate member 12 on the advancing side in the rotation direction by one of the paired second spring abutment portions 141d of the second intermediate member 14 on a side opposite to the advancing side in the rotation direction. That is, until the input torque reaches the torque T1 during the execution of the lock-up, each intermediate spring SPm transfers, to the first intermediate member 12, a part of the torque (part of an average torque) transferred from the driving member 11 to the second intermediate member 14 via the first outer spring SP21. Thus, the damper apparatus 10 has a third torque transfer path P3 including the first outer springs SP21, the second intermediate member 14, the intermediate springs SPm, the first intermediate member 12, and the second inner springs SP12.

As a result, until the torque input to the driving member 11 reaches the torque T1 described above during the execution of the lock-up, the torque is transferred from the driving member 11 to the driven member 16 via the first, second, and third torque transfer paths P1, P2, and P3. More specifically, while the deflections of all of the first and second inner springs SP11 and SP12, the first and second outer springs SP21 and SP22, and the intermediate springs SPm are permitted, the rotational torque from the first inner springs SP11 and the rotational torque from the first outer springs SP21, the second intermediate member 14, and the intermediate springs SPm are transferred to the second inner springs SP12. Further, the rotational torque from the first outer springs SP21 is transferred to the second outer springs SP22. While the deflections of all the springs SP11 to SPm are permitted, the springs SP11 to SPm damp (absorb) a fluctuation of the torque transferred to the driving member 11. Thus, the vibration damping performance of the damper apparatus 10 when the rotation speed of the driving member 11 is low can satisfactorily be improved.

When the torque input to the driving member 11 reaches the torque T1 described above and the first and second stoppers 21 and 22 are actuated, the first stopper 21 restricts the relative rotation between the first intermediate member 12 and the driven member 16 and the deflection of the second inner springs SP12, and the second stopper 22 restricts the relative rotation between the second intermediate member 14 and the driven member 16 and the deflection of the second outer springs SP22. By restricting the relative rotations of the first and second intermediate members 12 and 14 to the driven member 16, the deflection of the intermediate springs SPm is restricted as well. Thus, during a period from the time when the torque input to the driving member 11 reaches the torque T1 described above to the time when the input torque reaches the torque T2 described above and the third stopper 23 is actuated, the first inner springs SP11 and the first outer springs SP21 act in parallel to damp (absorb) the fluctuation of the torque transferred to the driving member 11.

In the damper apparatus 10, while the deflections of all the springs SP11 to SPm are permitted, the force applied to the first spring abutment portions 141c of the second intermediate member 14 from the first and second outer springs SP21 and SP22 may be opposite to the force applied to the second spring abutment portions 141d of the second intermediate member 14 from the intermediate springs SPm. Thus, when the first spring abutment portions are formed on one of the first and second annular members 141 and 142 of the second intermediate member 14 and the second spring abutment portions are formed on the other, shear forces acting on coupling portions of the first and second annular members 141 and 142 increase, and the durability of the second intermediate member 14 may decrease. When the first and second spring abutment portions 141c and 141d are provided on the first annular member 141 (single member) of the second intermediate member 14 as described above, the first annular member 141 can receive the two forces acting in opposite directions. Thus, the shear forces acting on the coupling portions (around the rivets) of the first and second annular members 141 and 142 can be reduced as compared to the case where the first spring abutment portions are formed on one of the first and second annular members 141 and 142 and the second spring abutment portions are formed on the other. As a result, it is possible to further improve the durability of the coupling portions of the first and second annular members 141 and 142 and furthermore the durability of the second intermediate member 14 to which the torque is transferred from the first outer springs SP21 having a larger share of the torque than the first inner springs SP11.

Similarly, in the damper apparatus 10, while the deflections of all the springs SP11 to SPm are permitted, the force applied to the first intermediate member 12 from the first and second inner springs SP11 and SP12 may be opposite to the force applied to the first intermediate member 12, that is, the second plate member 122 from the intermediate springs SPm. When the outer abutment portions 122d are provided on the second plate member 122 including the coupling abutment portions 122c, the second plate member 122 (single member) can substantially receive the two forces acting in opposite directions. Thus, it is possible to reduce the shear forces acting on fitting portions (opening portions 121h and protruding portions 122p) of the first and second plate members 121 and 122. Accordingly, it is possible to further improve the durability of the fitting portions of the spring abutment portions 121c of the first plate member 121 and the coupling abutment portions 122c of the second plate member 122 and furthermore the durability of the first intermediate member 12.

The description of the designing procedure of the damper apparatus 10 is continued.

As described above, in the damper apparatus 10, when the deflections of all of the first and second inner springs SP11 and SP12, the first and second outer springs SP21 and SP22, and the intermediate springs SPm are permitted, the torque (average torque) is transferred between the driving member 11 and the driven member 16 via all the springs SP11 to SPm. The inventors have extensively conducted researches and analyses into the damper apparatus 10 having the complicated torque transfer paths that are not provided in series or in parallel. As a result, the inventors have found that the damper apparatus 10 has two natural frequencies as a whole when the deflections of all the springs SP11 to SPm are permitted. According to the researches and analyses conducted by the inventors, also in the damper apparatus 10, when resonance occurs at a smaller one of the two natural frequencies (natural frequency on a low speed rotation side (low frequency side)) in accordance with the frequency of the vibration transferred to the driving member 11 (in this embodiment, resonance of the first intermediate member 12 when the first and second intermediate members 12 and 14 vibrate in the same phase), a phase of the vibration transferred from the second inner springs SP12 to the driven member 16 deviates from a phase of the vibration transferred from the second outer springs SP22 to the driven member 16. Therefore, as the rotation speed of the driving member 11 increases after the resonance occurs at the smaller one of the two natural frequencies, one of the vibration transferred from the second inner springs SP12 to the driven member 16 and the vibration transferred from the second outer springs SP22 to the driven member 16 cancels out at least a part of the other.

Based on the findings described above, the inventors have formulated an equation of motion as represented by Expression (1) below regarding a vibration system including the damper apparatus 10 in a state in which the torque is transferred from the engine (internal combustion engine) EG to the driving member 11 through the execution of the lock-up. In Expression (1), "$J_1$" represents a moment of inertia of the driving member 11, "$J_{21}$" represents a moment of inertia of the first intermediate member 12, "$J_{22}$" represents a moment of inertia of the second intermediate member 14, and "$J_3$" represents a moment of inertia of the driven member 16. Further, "$\theta_1$" represents a torsion angle of the driving member 11, "$\theta_{21}$" represents a torsion angle of the first intermediate member 12, "$\theta_{22}$" represents a torsion angle of the second intermediate member 14, and "$\theta_3$" represents a torsion angle of the driven member 16. Still further, "$k_1$" represents a combined spring rate of the plurality of first inner springs SP11 acting in parallel between the driving member 11 and the first intermediate member 12, "$k_2$" represents a combined spring rate of the plurality of second inner springs SP12 acting in parallel between the first intermediate member 12 and the driven member 16, "$k_3$" represents a combined spring rate of the plurality of first outer springs SP21 acting in parallel between the driving member 11 and the second intermediate member 14, "$k_4$" represents a combined spring rate of the plurality of second outer springs SP22 acting in parallel between the second intermediate member 14 and the driven member 16, "$k_5$" represents a combined spring rate (stiffness) of the plurality of intermediate springs SPm acting in parallel between the first intermediate member 12 and the second intermediate member 14, "$k_R$" represents a stiffness, that is, a spring rate in the transmission TM, drive shafts, and the like that are disposed in a range from the driven member 16 to wheels of the vehicle, and "T" represents an input torque transferred from the engine EG to the driving member 11.

[Math. 1]

$$\begin{pmatrix} J_1 & 0 & 0 & 0 \\ 0 & J_{21} & 0 & 0 \\ 0 & 0 & J_{22} & 0 \\ 0 & 0 & 0 & J_3 \end{pmatrix} \begin{pmatrix} \ddot{\theta}_3 \\ \ddot{\theta}_{21} \\ \ddot{\theta}_{22} \\ \ddot{\theta}_3 \end{pmatrix} + \\ \begin{pmatrix} k_1+k_3 & -k_1 & -k_3 & 0 \\ -k_1 & k_1+k_2+k_3 & -k_3 & -k_2 \\ -k_1 & -k_3 & k_3+k_4+k_5 & -k_4 \\ 0 & -k_2 & -k_4 & k_2+k_4+k_R \end{pmatrix} \begin{pmatrix} \theta_1 \\ \theta_{21} \\ \theta_{22} \\ \theta_3 \end{pmatrix} = \begin{pmatrix} T \\ 0 \\ 0 \\ 0 \end{pmatrix}$$

(1)

The inventors have assumed that the input torque T periodically vibrates as represented by Expression (2) below, and also assumed that the torsion angle $\theta_1$ of the driving member 11, the torsion angle $\theta_{21}$ of the first intermediate member 12, the torsion angle $\theta_{22}$ of the second intermediate member 14, and the torsion angle $\theta_3$ of the driven member 16 periodically respond (vibrate) as represented by Expression (3) below. In Expressions (2) and (3), "$\omega$" represents an angular frequency in the periodic fluctuation (vibration) of the input torque T. In Expression (3), "$\Theta_1$" represents an amplitude of the vibration (vibration amplitude, that is, maximum torsion angle) of the driving member 11 that occurs along with the transfer of the torque from the engine EC "$\Theta_2$," represents an amplitude of the vibration (vibration amplitude) of the first intermediate member 12 that occurs along with the transfer of the torque from the engine EG to the driving member 11, "$\Theta_{22}$" represents an amplitude of the vibration (vibration amplitude) of the second intermediate member 14 that occurs along with the transfer of the torque from the engine EG to the driving member 11, and "$\Theta_3$" represents an amplitude of the vibration (vibration amplitude) of the driven member 16 that occurs along with the transfer of the torque from the engine EG to the driving member 11. Under those assumptions, Expressions (2) and (3) are substituted into Expression (1), and "sin ωt" is cleared from both sides. Accordingly, an identity of Expression (4) below can be yielded.

[Math. 2]

$$T = T_3 \sin\omega t \quad (2)$$

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \sin\omega t \quad (3)$$

$$\begin{pmatrix} -\omega^2 J_1 + k_1 + k_3 & -k_1 & -k_3 & 0 \\ -k_1 & -\omega^2 J_7 + k_1 + k_3 + k_3 & -k_5 & -k_2 \\ -k_3 & -k_5 & -\omega^2 J_{22} + k_3 + k_4 + k_5 & -k_4 \\ 0 & -k_2 & -k_4 & -\omega^2 J_3 + k_2 + k_4 + k_R \end{pmatrix} \begin{pmatrix} \Theta_1 \\ \Theta_{21} \\ \Theta_{22} \\ \Theta_3 \end{pmatrix} = \begin{pmatrix} T_0 \\ 0 \\ 0 \\ 0 \end{pmatrix} \quad (4)$$

The inventors have focused attention on the fact that, when the vibration amplitude $\Theta_3$ of the driven member 16 in Expression (4) is zero, the vibration from the engine EG is damped by the damper apparatus 10 and therefore the vibration is not theoretically transferred to the transmission TM, the drive shafts, and the like that are provided at a stage subsequent to the driven member 16. From this viewpoint, the inventors have solved the identity of Expression (4) in terms of the vibration amplitude $\Theta_3$, and have set $\Theta_3 = 0$, thereby yielding a conditional expression represented by Expression (5) below. When the relationship of Expression (5) holds, the vibrations canceled out, and the vibration amplitude $\Theta_3$ of the driven member 16 is theoretically zero.

[Math. 3]

$$\omega^2 = \frac{k_5 \cdot (k_1 + k_3) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2} \quad (5)$$

Figure 7:
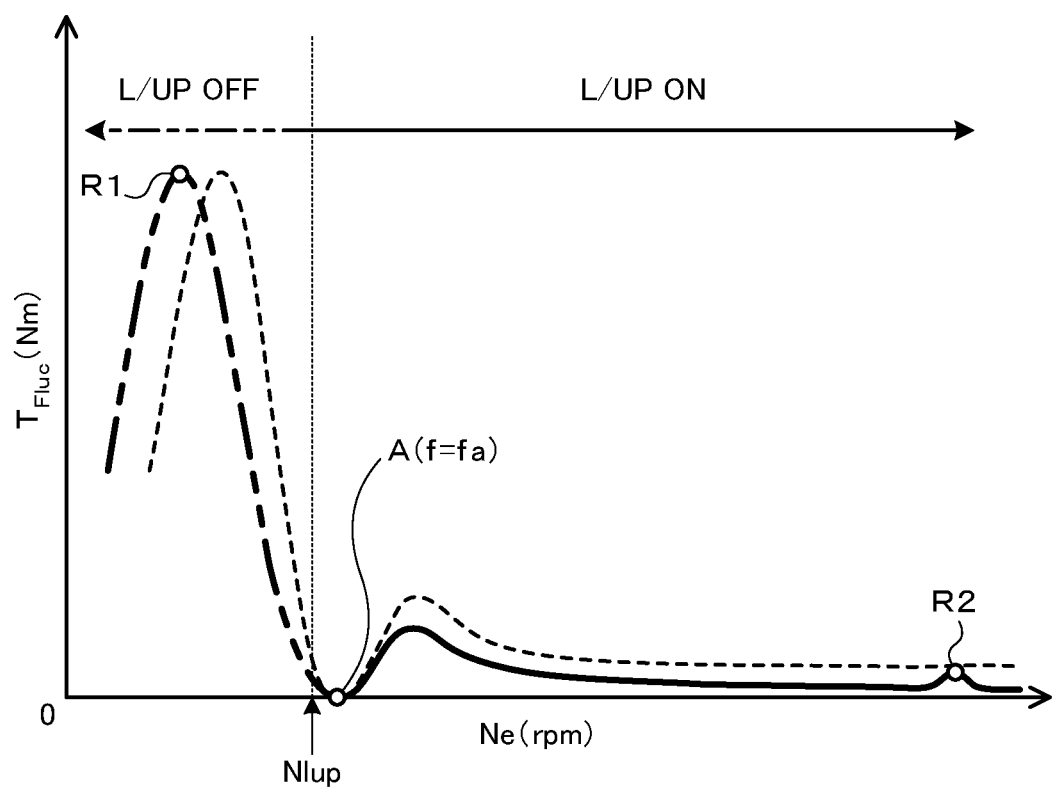
FIG. 7 is an explanatory diagram exemplifying a relationship between the rotation speed of an engine and theoretical torque fluctuations of output elements of damper apparatuses.

The analysis results described above demonstrate that, in the damper apparatus 10 having the structure described above, an anti-resonance point A at which the vibration amplitude $\Theta_3$ (torque fluctuation) of the driven member 16 is theoretically zero can be set as illustrated in FIG. 7 such that the phase of the vibration transferred from the second inner springs SP12 to the driven member 16 deviates (is inverted) by 180 degrees from the phase of the vibration transferred from the second outer springs SP22 to the driven member 16 and both the vibrations are canceled out through the occurrence of the resonance at the smaller one of the two natural frequencies. When the frequency at the anti-resonance point A is represented by "fa" and "$\omega = 2\pi fa$" is substituted into Expression (5) above, the frequency fa at the anti-resonance point A is represented by Expression (6) below. FIG. 7 exemplifies a relationship between the rotation speed of the engine EG and theoretical (under the assumption that no hysteresis is present) vibration amplitudes (torque fluctuations) of the driven member of the damper apparatus disclosed herein and a driven member of a damper apparatus from which the intermediate springs SPm are omitted (damper apparatus disclosed in JP 2012-506006 A; hereinafter referred to as "damper apparatus of comparative example").

[Math. 4]

$$fa = \frac{1}{2\pi} \sqrt{\frac{k_5 \cdot (k_1 + k_3) \cdot (k_2 + k_4) + k_1 k_2 k_3 + k_1 k_2 k_4 + k_1 k_3 k_4 + k_2 k_3 k_4}{J_{21} k_3 k_4 + J_{22} k_1 k_2}} \quad (6)$$

Under the assumption that the torsion angle $\theta_1$ of the driving member 11 and the torsion angle $\theta_3$ of the driven member 16 are zero and displacements of the driving member 11 and the driven member 16 are both zero, Expression (1) can be transformed into Expression (7) below. Under the assumption that the first and second intermediate members 12 and 14 harmonically vibrate as represented by Expression (8) below, Expression (8) is substituted into Expression (7), and "sin $\omega t$" is cleared from both sides. Accordingly, an identity of Expression (9) below can be yielded.

[Math. 5]

$$\begin{pmatrix} J_{21} & 0 \\ 0 & J_{22} \end{pmatrix} \begin{pmatrix} \ddot{\theta}_{21} \\ \ddot{\theta}_{22} \end{pmatrix} + \begin{pmatrix} k_1 + k_2 + k_3 & -k_5 \\ -k_5 & k_7 + k_4 + k_5 \end{pmatrix} \begin{pmatrix} \theta_{21} \\ \theta_{22} \end{pmatrix} = \begin{pmatrix} 0 \\ 0 \end{pmatrix} \quad (7)$$

$$\begin{pmatrix} \theta_{21} \\ \theta_{22} \end{pmatrix} = \begin{pmatrix} \Theta_{21} \\ \Theta_{22} \end{pmatrix} \sin\omega t \quad (8)$$

$$\begin{pmatrix} -\omega^2 J_{21} + k_1 + k_2 + k_5 & -k_5 \\ -k_3 & -\omega^2 J_{22} + k_3 + k_4 + k_5 \end{pmatrix} \begin{pmatrix} \Theta_{21} \\ \Theta_{22} \end{pmatrix} = \begin{pmatrix} 0 \\ 0 \end{pmatrix} \quad (9)$$

When the first and second intermediate members 12 and 14 harmonically vibrate, the amplitudes $\Theta_{21}$ and $\Theta_{22}$ are not both zero. Therefore, the determinant of the square matrix on the left-hand side of Expression (9) is zero, and a conditional expression of Expression (10) below should hold. Expression (10) is a quadratic equation regarding square values $\omega^2$ of two natural angular frequencies of the damper apparatus 10. Thus, two natural angular frequencies $\omega_1$ and $\omega_2$ of the damper apparatus 10 are represented as in Expressions (11) and (12) below, and $\omega_1 < \omega_2$ holds. As a result, when "$f_{21}$" represents a frequency of resonance that generates the resonance point A (resonance point R1), that is, a natural frequency of the first intermediate member 12, and "$f_{22}$" represents a frequency of resonance that occurs on a higher speed rotation side than the anti-resonance point A (resonance point R2), that is, a natural frequency of the second intermediate member 14, the natural frequency $f_{21}$ on the low speed rotation side (low frequency side) is represented by Expression (13) below, and the natural frequency $f_{22}$ ($f_{22} > f_{21}$) on the high speed rotation side (high frequency side) is represented by Expression (14) below.

[Math. 6]

$$(-\omega^2 J_{21} + k_1 + k_2 + k_3)(-\omega^2 J_{22} + k_3 + k_4 + k_5) - k_5^2 = 0 \quad (10)$$

$$\omega_1 = \sqrt{\frac{1}{2}\left\{\frac{k_1+k_2+k_3}{J_{21}} + \frac{k_3+k_4+k_5}{J_{22}} - \sqrt{\left(\frac{k_3+k_4+k_5}{J_{22}} - \frac{k_1+k_2+k_3}{J_{21}}\right)^2 + \frac{4k_5^2}{J_{21}J_{22}}}\right\}} \quad (11)$$

$$\omega_2 = \sqrt{\frac{1}{2}\left\{\frac{k_1+k_2+k_3}{J_{21}} + \frac{k_1+k_4+k_5}{J_{22}} + \sqrt{\left(\frac{k_3+k_4+k_5}{J_{22}} - \frac{k_1+k_2+k_5}{J_{21}}\right)^2 + \frac{4k_5^2}{J_{21}J_{22}}}\right\}} \quad (12)$$

$$f_{21} = \frac{1}{2\pi}\sqrt{\frac{\frac{k_1+k_2+k_5}{2J_{21}} + \frac{k_3+k_1+k_5}{2J_{22}} - \sqrt{\left(\frac{k_3+k_4+k_5}{2J_{22}} - \frac{k_1+k_2+k_5}{2J_{21}}\right)^2 + \frac{k_5^2}{J_{21}J_{22}}}}{}} \quad (13)$$

$$f_{22} = \frac{1}{2\pi}\sqrt{\frac{\frac{k_1+k_2+k_5}{2J_{21}} + \frac{k_3+k_4+k_5}{2J_{22}} - \sqrt{\left(\frac{k_3+k_4+k_5}{2J_{22}} - \frac{k_1+k_2+k_5}{2J_{21}}\right)^2 + \frac{k_5^2}{J_{21}J_{22}}}}{}} \quad (14)$$

An equivalent stiffness $k_{eq}$ of the damper apparatus 10 when the deflections of all the springs SP11 to SPm are permitted can be determined as follows. That is, under the assumption that a constant input torque (static external force) represented by $T = T_0$ is transferred to the driving member 11 and a relationship of balance as represented by Expression (15) below holds, $T = T_0$ and Expression (15) are substituted into Expression (1), and accordingly an identity of Expression (16) below can be yielded.

[Math. 7]

$$\begin{bmatrix} \theta_1 \\ \theta_{21} \\ \theta_{22} \\ \theta_3 \end{bmatrix} = \begin{bmatrix} \Theta_1 \\ \Theta_{21} \\ \Theta_{22} \\ \Theta_3 \end{bmatrix} \quad (15)$$

$$\begin{pmatrix} k_1+k_3 & -k_1 & -k_3 & 0 \\ -k_1 & k_1+k_2+k_5 & -k_5 & -k_2 \\ -k_3 & -k_5 & k_3+k_4+k_5 & -k_4 \\ 0 & -k_2 & -k_4 & k_2+k_4+k_R \end{pmatrix} \begin{pmatrix} \Theta_1 \\ \Theta_{21} \\ \Theta_{22} \\ \Theta_3 \end{pmatrix} = \begin{pmatrix} T \\ 0 \\ 0 \\ 0 \end{pmatrix} \quad (16)$$

Among the torque $T_0$, the equivalent stiffness $k_{eq}$ of the damper apparatus 10, the vibration amplitude (torsion angle) $\Theta_1$ of the driving member 11, and the vibration amplitude (torsion angle) $\Theta_3$ of the driven member 16, a relationship of $T_0 = k_{eq} \cdot (\Theta_1 - \Theta_3)$ holds. When the identity of Expression (16) is solved in terms of the vibration amplitudes (torsion angles) $\Theta_1$ and $\Theta_3$, "$\Theta_1 - \Theta_3$" is represented by Expression (17) below. Based on $T_0 = k_{eq} \cdot (\Theta_1 - \Theta_3)$ and Expression (17), the equivalent stiffness $k_{eq}$ of the damper apparatus 10 is represented by Expression (18) below.

[Math. 8]

$$\Theta_1 - \Theta_3 = \frac{\{k_5 - (k_1 + k_2 + k_3 + k_4) + (k_1 + k_2)(k_3 + k_4)\}T_0}{k_5(k_1 + k_3)(k_2 + k_4) + (k_1 k_2 k_3 + k_1 k_2 k_4 + k_1 k_3 k_4 + k_2 k_3 k_4)} \quad (17)$$

$$K_{eq} = \frac{k_5(k_1 + k_3)(k_2 + k_4) + (k_1 k_2 k_3 + k_1 k_3 k_4 + k_1 k_2 k_4 + k_2 k_3 k_4)}{k_5(k_1 + k_2 + k_3 + k_4) + (k_1 + k_2)(k_3 + k_4)} \quad (18)$$

FIG. 8 to FIG. 13 illustrate analysis results obtained by the inventors for the natural frequency $f_{21}$ on the low speed rotation side, the frequency fa at the anti-resonance point A, and the equivalent stiffness $k_{eq}$ of the damper apparatus 10 that are obtained as described above. FIG. 8 to FIG. 13 illustrate how the natural frequency $f_{21}$, the frequency fa at the anti-resonance point A, and the equivalent stiffness $k_{eq}$ are changed when only one parameter out of the combined spring rates $k_1$, $k_2$, $k_3$, $k_4$, and $k_5$ and the moments of inertia $J_{21}$ and $J_{22}$ of the first and second intermediate members 12 and 14 is changed while the parameters other than the one parameter are set to constant values (fixed values).

Figure 8:
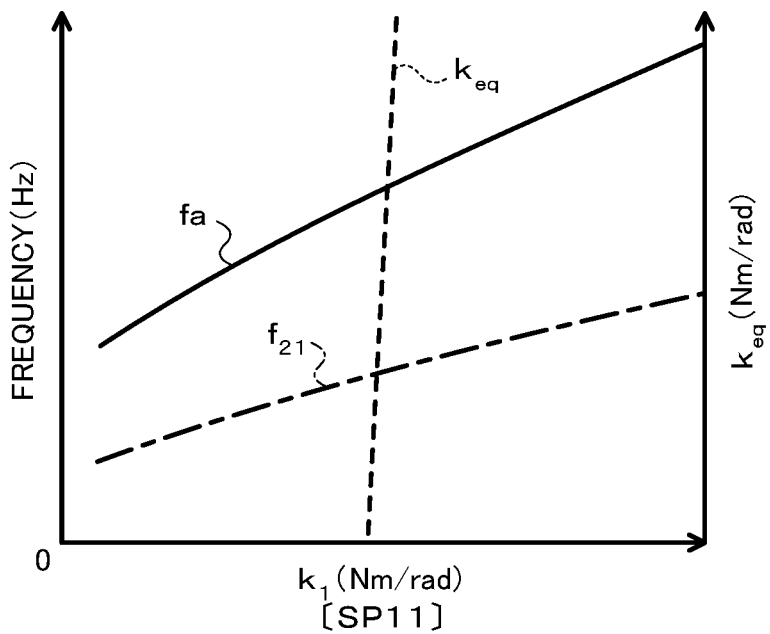
FIG. 8 is an explanatory diagram exemplifying a relationship between a stiffness of the first elastic body of the damper apparatus disclosed herein and a natural frequency on a low speed rotation side, a frequency at an anti-resonance point, and an equivalent stiffness of the damper apparatus.

When only the combined spring rate (stiffness) $k_1$ of the first inner springs (first elastic bodies) SP11 is changed while the combined spring rates $k_2$, $k_3$, $k_4$, and $k_5$ and the moments of inertia $J_{21}$ and $J_{22}$ of the damper apparatus 10 are set to constant values, as illustrated in FIG. 8, the natural frequency $f_{21}$ and the frequency fa at the anti-resonance point A increase as the combined spring rate $k_1$ increases, and gradually decrease as the combined spring rate $k_1$ decreases. As illustrated in FIG. 8, the equivalent stiffness $k_{eq}$ steeply increases when the combined spring rate $k_1$ slightly increases from a preadapted value, and steeply decreases when the combined spring rate $k_1$ slightly decreases from the adapted value. That is, the change (gradient of change) in the equivalent stiffness $k_{eq}$ is significantly large relative to the change in the combined spring rate $k_1$ of the first inner springs SP11.

Figure 9:
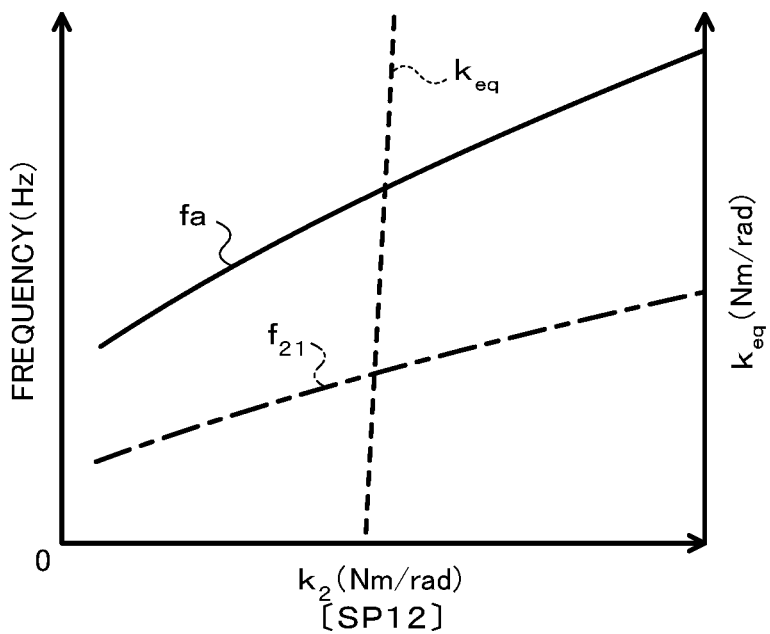
FIG. 9 is an explanatory diagram exemplifying a relationship between a stiffness of the second elastic body of the damper apparatus disclosed herein and the natural frequency on the low speed rotation side, the frequency at the anti-resonance point, and the equivalent stiffness of the damper apparatus.

Also when only the combined spring rate (stiffness) $k_2$ of the second inner springs (second elastic bodies) SP12 is changed while the combined spring rates $k_1$, $k_3$, $k_4$, and $k_5$ and the moments of inertia $J_{21}$ and $J_{22}$ of the damper apparatus 10 are set to constant values, as illustrated in FIG. 9, the natural frequency $f_{21}$ and the frequency fa at the anti-resonance point A increase as the combined spring rate $k_2$ increases, and gradually decrease as the combined spring rate $k_2$ decreases. As illustrated in FIG. 9, the equivalent stiffness $k_{eq}$ steeply increases when the combined spring rate $k_2$ slightly increases from a preadapted value, and steeply decreases when the combined spring rate $k_2$ slightly decreases from the adapted value. That is, the change (gradient of change) in the equivalent stiffness $k_{eq}$ is also significantly large relative to the change in the combined spring rate $k_2$ of the second inner springs SP12.

Figure 10:
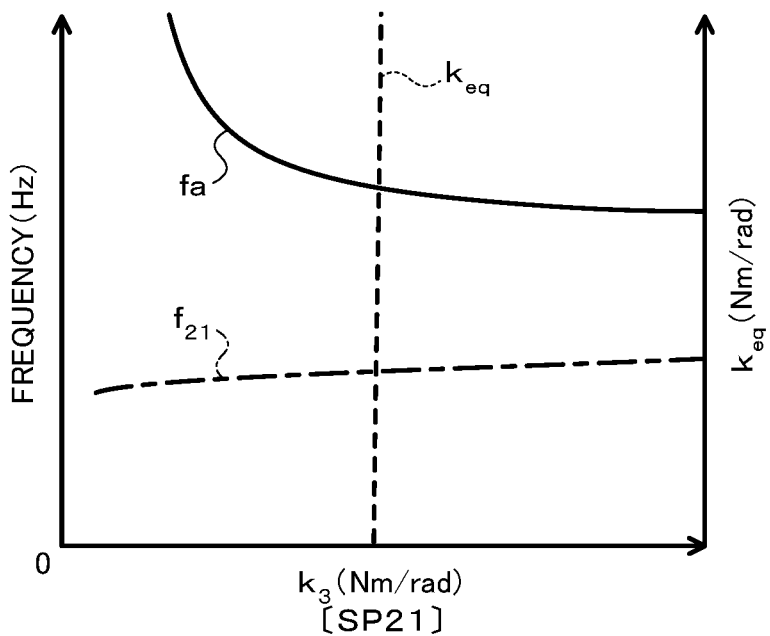
FIG. 10 is an explanatory diagram exemplifying a relationship between a stiffness of the third elastic body of the damper apparatus disclosed herein and the natural frequency on the low speed rotation side, the frequency at the anti-resonance point, and the equivalent stiffness of the damper apparatus.

When only the combined spring rate (stiffness) $k_3$ of the first outer springs (third elastic bodies) SP21 is changed while the combined spring rates $k_1$, $k_2$, $k_4$, and $k_5$ and the moments of inertia $J_{21}$ and $J_{22}$ of the damper apparatus 10 are set to constant values, as illustrated in FIG. 10, the natural frequency $f_{21}$ slightly increases (is kept substantially constant) as the combined spring rate $k_3$ increases, and the frequency fa at the anti-resonance point A increases as the combined spring rate $k_3$ decreases, and gradually decreases as the combined spring rate $k_3$ increases. As illustrated in FIG. 10, the equivalent stiffness $k_{eq}$ steeply decreases when the combined spring rate $k_3$ slightly decreases from a preadapted value, and steeply increases when the combined spring rate $k_3$ slightly increases from the adapted value. That is, the change (gradient of change) in the equivalent stiffness $k_{eq}$ is also significantly large relative to the change in the combined spring rate $k_3$ of the first outer springs SP21.

Figure 11:
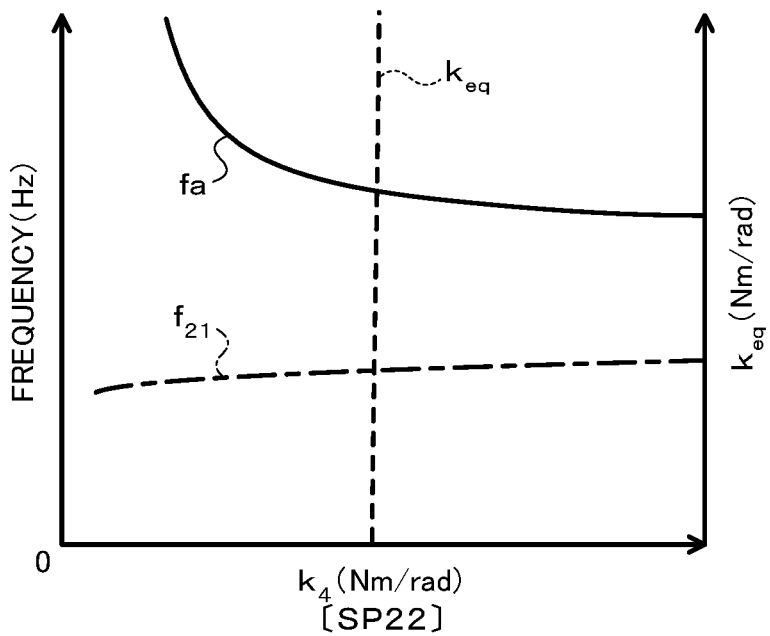
FIG. 11 is an explanatory diagram exemplifying a relationship between a stiffness of the fourth elastic body of the damper apparatus disclosed herein and the natural frequency on the low speed rotation side, the frequency at the anti-resonance point, and the equivalent stiffness of the damper apparatus.

Also when only the combined spring rate (stiffness) $k_4$ of the second outer springs (fourth elastic bodies) SP22 is changed while the combined spring rates $k_1$, $k_2$, $k_3$, and $k_5$ and the moments of inertia $J_{21}$ and $J_{22}$ of the damper apparatus 10 are set to constant values, as illustrated in FIG. 11, the natural frequency $f_{21}$ slightly increases (is kept substantially constant) as the combined spring rate $k_4$ increases, and the frequency fa at the anti-resonance point A increases as the combined spring rate $k_4$ decreases, and gradually decreases as the combined spring rate $k_4$ increases. As illustrated in FIG. 11, the equivalent stiffness $k_{eq}$ steeply decreases when the combined spring rate $k_4$ slightly decreases from a preadapted value, and steeply increases when the combined spring rate $k_4$ slightly increases from the adapted value. That is, the change (gradient of change) in the equivalent stiffness $k_{eq}$ is also significantly large relative to the change in the combined spring rate $k_4$ of the second outer springs SP22.

Figure 12:
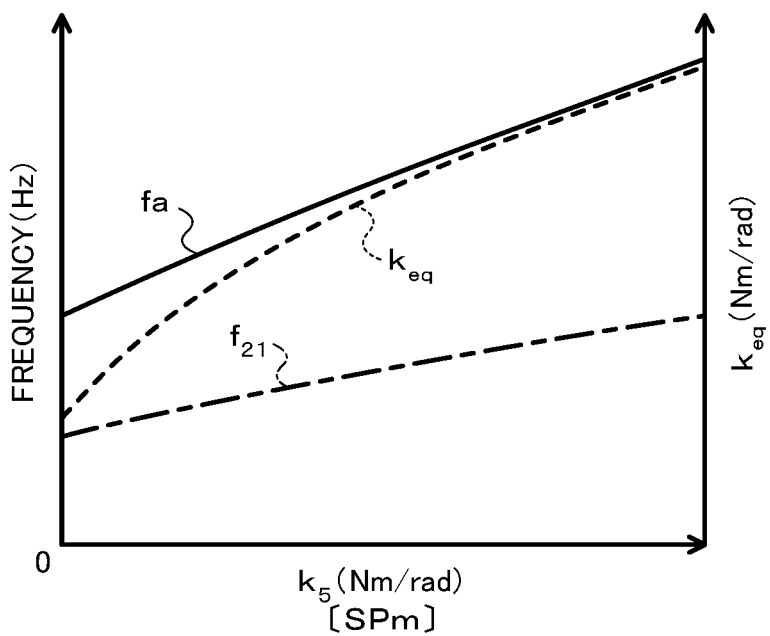
FIG. 12 is an explanatory diagram exemplifying a relationship between a stiffness of a fifth elastic body of the damper apparatus disclosed herein and the natural frequency on the low speed rotation side, the frequency at the anti-resonance point, and the equivalent stiffness of the damper apparatus.

When only the combined spring rate (stiffness) $k_5$ of the intermediate springs (fifth elastic bodies) SPm is changed while the combined spring rates $k_1$, $k_2$, $k_3$, and $k_4$ and the moments of inertia $J_{21}$ and $J_{22}$ of the damper apparatus 10 are set to constant values, as illustrated in FIG. 12, the natural frequency $f_{21}$ and the frequency fa at the anti-resonance point A increase as the combined spring rate $k_5$ increases, and gradually decrease as the combined spring rate $k_5$ decreases. As illustrated in FIG. 12, a difference between the natural frequency $f_{21}$ and the frequency fa at the anti-resonance point A (fa–$f_{21}$) corresponding to the certain combined spring rate $k_5$ gradually increases as the combined spring rate $k_5$ increases. When only the combined spring rate $k_5$ of the intermediate springs SPm is changed, as illustrated in FIG. 12, the equivalent stiffness $k_{eq}$ increases as the combined spring rate $k_5$ increases, and gradually decreases as the combined spring rate $k_5$ decreases. That is, the change (gradient of change) in the equivalent stiffness $k_{eq}$ relative to the change in the combined spring rate (stiffness) $k_5$ of the intermediate springs SPm is significantly smaller than the changes (gradients of changes) in the equivalent stiffness $k_{eq}$ relative to the changes in the combined spring rates (stiffnesses) $k_1$, $k_2$, $k_3$, and $k_4$.

Figure 13:
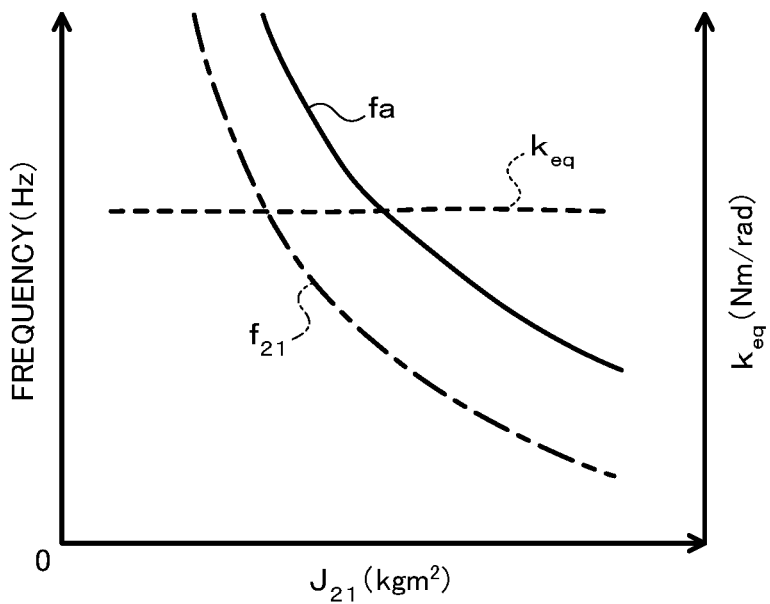
FIG. 13 is an explanatory diagram exemplifying a relationship between a moment of inertia of a first intermediate element of the damper apparatus disclosed herein and the natural frequency on the low speed rotation side, the frequency at the anti-resonance point, and the equivalent stiffness of the damper apparatus.

When only the moment of inertia $J_{21}$ of the first intermediate member 12 is changed while the combined spring rates $k_1$, $k_2$, $k_3$, $k_4$, and $k_5$ and the moment of inertia $J_{22}$ of the second intermediate member 14 of the damper apparatus 10 are set to constant values, as illustrated in FIG. 13, the natural frequency $f_{21}$ and the frequency fa at the anti-resonance point A increase as the moment of inertia $J_{21}$ decreases, and gradually decrease as the moment of inertia $J_{21}$ increases. Even when only the moment of inertia $J_{21}$ of the first intermediate member 12 is changed, as illustrated in FIG. 13, the equivalent stiffness $k_{eq}$ is kept substantially constant. Although illustration is omitted, also when only the moment of inertia $J_{22}$ of the second intermediate member 14 is changed while the combined spring rates $k_1$, $k_2$, $k_3$, $k_4$, and $k_5$ and the moment of inertia $J_{21}$ of the first intermediate member 12 of the damper apparatus 10 are set to constant values, similar results are obtained as in the case where only the moment of inertia $J_{21}$ of the first intermediate member 12 is changed.

As can be understood from the analysis results described above, the natural frequency $f_{21}$ on the low speed rotation side (see Expression (13)) and the frequency fa at the anti-resonance point A (see Expression (6)) can further be reduced by reducing the stiffness of the intermediate spring SPm (reducing the spring rate $k_m$ and the combined spring rate $k_5$). The difference between the natural frequency $f_{21}$ on the low speed rotation side and the frequency fa at the anti-resonance point A (fa–$f_{21}$) can further be increased by conversely increasing the stiffness of the intermediate spring SPm (increasing the spring rate $k_m$ and the combined spring rate $k_5$). Even when the stiffness of the intermediate spring SPm is reduced (the spring rate $k_m$ and the combined spring rate $k_5$ are reduced), the equivalent stiffness $k_{eq}$ does not decrease significantly. Thus, in the damper apparatus 10, the natural frequency $f_{21}$ on the low speed rotation side and the frequency fa at the anti-resonance point A can appropriately be set by adjusting the stiffness of the intermediate spring SPm (spring rate $k_m$ and combined spring rate $k_5$) while the equivalent stiffness $k_{eq}$ is appropriately kept in accordance with the maximum torque input to the driving member 11 and an increase in the weights, that is, the moments of inertia $J_{21}$ and $J_{22}$ of the first and second intermediate members 12 and 14 is suppressed. Further, the natural frequency $f_{21}$ on the low speed rotation side and the frequency fa at the anti-resonance point A can further be reduced by reducing the stiffnesses of the first and second inner springs SP11 and SP12 (reducing the spring rates $k_{11}$ and $k_{12}$ and the combined spring rates $K_1$ and $K_2$). Still further, the frequency fa at the anti-resonance point A can further be reduced by increasing the stiffnesses of the first and second outer springs SP21 and SP22 (increasing the spring rates $k_{21}$ and $k_{22}$ and the combined spring rates $K_3$ and $K_4$).

In the vehicle on which the engine (internal combustion engine) EG is mounted as a source of traveling power, the power transfer efficiency between the engine EG and the transmission TM is improved by further reducing a lock-up rotation speed Nlup and mechanically transferring the torque from the engine EG to the transmission TM at an early stage. Thus, the fuel efficiency of the engine EG can further be improved. In a low rotation speed range that is about 500 rpm to 1500 rpm and may be a range in which the lock-up rotation speed Nlup is set, the vibration transferred from the engine EG to the driving member 11 via the lock-up clutch increases. In particular, the vibration level remarkably increases in a vehicle on which an engine is mounted with a small number of cylinders, such as a three-cylinder or four-cylinder engine. In order to prevent a significant vibration from being transferred to the transmission TM or the like during or immediately after the execution of the lock-up, it is necessary to further reduce, in a rotation speed range in the vicinity of the lock-up rotation speed Nlup, the vibration level of the entire damper apparatus 10 (driven member 16) that transfers the torque (vibration) from the engine EG to the transmission TM in a state in which the lock-up is executed.

In view of the above, the inventors have structured the damper apparatus 10 such that the anti-resonance point A described above is formed when the rotation speed of the engine EG falls within the range of 500 rpm to 1500 rpm (expected range in which the lock-up rotation speed Nlup is set) based on the lock-up rotation speed Nlup defined for the lock-up clutch 8. A rotation speed Nea of the engine EG corresponding to the frequency fa at the anti-resonance point A is represented by Nea=(120/n)·fa, where "n" represents the number of cylinders of the engine (internal combustion engine) EG. Thus, in the damper apparatus 10, the combined spring rate $k_1$ of the plurality of first inner springs SP11, the combined spring rate $k_2$ of the plurality of second inner springs SP12, the combined spring rate $k_3$ of the plurality of first outer springs SP21, the combined spring rate $k_4$ of the plurality of second outer springs SP22, the combined spring rate $k_5$ of the plurality of intermediate springs SPm, the moment of inertia $J_{21}$ of the first intermediate member 12 (the moment of inertia of the turbine runner 5 or the like that is coupled so as to rotate together is taken into consideration (added as a sum); the same applies hereinafter), and the moment of inertia $J_{22}$ of the second intermediate member 14 are selected and set so as to satisfy Expression (19) below. That is, in the damper apparatus 10, the spring rates $k_{11}$, $k_{12}$, $k_{21}$, $k_{22}$, and $k_m$ of the springs SP11 to SPm and the moments of inertia $J_{21}$ and $J_{22}$ of the first and second intermediate members 12 and 14 are selected and set based on the frequency fa at the anti-resonance point A (and the lock-up rotation speed Nlup).

[Math. 9]

$$500 \text{ rpm} \leq 120/nfa \leq 1500 \text{ rpm} \quad (19)$$

As described above, the anti-resonance point A at which the vibration amplitude $\Theta_3$ of the driven member 16 can theoretically be set to zero (the vibration can further be reduced) is set within the low rotation speed range of 500 rpm to 1500 rpm (expected range in which the lock-up rotation speed Nlup is set). Thus, as illustrated in FIG. 7, the resonance that generates the anti-resonance point A (resonance that needs to be caused in order to form the anti-resonance point A, in this embodiment, the resonance of the first intermediate member 12; see the resonance point R1 in FIG. 7) can be shifted to a lower speed rotation side (lower frequency side) so as to be included in a non-lock-up range of the lock-up clutch 8 (see a long dashed double-short dashed line in FIG. 7). That is, in this embodiment, the resonance of the first intermediate member 12 (resonance at the smaller one of the two natural frequencies) is imaginary resonance that does not occur in the rotation speed range in which the damper apparatus 10 is used. As illustrated in FIG. 7, the rotation speed corresponding to the smaller one of the two natural frequencies of the damper apparatus 10 (natural frequency of the first intermediate member 12) is lower than the lock-up rotation speed Nlup of the lock-up clutch 8, and the rotation speed corresponding to a larger one of the two natural frequencies of the damper apparatus 10 (natural frequency of the second intermediate member 14) is higher than the lock-up rotation speed Nlup. Thus, one of the vibration transferred from the second inner springs SP12 to the driven member 16 and the vibration transferred from the second outer springs SP22 to the driven member 16 can cancel out at least a part of the other from the time when the lock-up is executed by the lock-up clutch 8.

When the damper apparatus 10 is structured so as to satisfy Expression (19) above, the spring rates $k_{11}$, $k_{12}$, $k_{21}$, $k_{22}$, and $k_m$ and the moments of inertia $J_{21}$ and $J_{22}$ are preferably selected and set so that the frequency of the resonance that generates the anti-resonance point A (see the resonance point R1 in FIG. 7) is smaller than the frequency fa at the anti-resonance point A and is as smaller as possible. Therefore, in the damper apparatus 10 of this embodiment, the values of the spring rates $k_{11}$, $k_{12}$, $k_{21}$, $k_{22}$, and $k_m$ are defined so as to satisfy the relationship of $k_{11} < k_m < k_{12} < k_{22} < k_{21}$ described above.

That is, in the damper apparatus 10, the spring rate $k_m$ of the intermediate spring SPm and the spring rates $k_{11}$ and $k_{12}$ of the first and second inner springs SP11 and SP12 are defined as small values so that the natural frequency $f_{21}$ on the low speed rotation side and the frequency fa at the anti-resonance point A are smaller. Further, the spring rates $k_{21}$ and $k_{22}$ of the first and second outer springs SP21 and SP22 are defined as large values so that the natural frequency $f_{21}$ on the low speed rotation side is smaller. Thus, the natural frequency $f_{21}$ on the low speed rotation side and the frequency fa at the anti-resonance point A are smaller. Accordingly, the start point of a rotation speed band (frequency band) in which one of the vibration transferred from the second inner springs SP12 to the driven member 16 and the vibration transferred from the second outer springs SP22 to the driven member 16 cancels out at least a part of the other can be set to a lower speed rotation side (lower frequency side). By setting the start point of the rotation speed band to the low speed rotation side, the rotation speed (frequency) at which the phase of the vibration transferred from the second inner springs SP12 to the driven member 16 deviates by 180 degrees from the phase of the vibration transferred from the second outer springs SP22 to the driven member 16 can also be set to the low speed rotation side. As a result, the lock-up is permitted at an even lower rotation speed, and the vibration damping performance in the low rotation speed range can further be improved.

In the damper apparatus 10, as illustrated in FIG. 7, when the rotation speed of the engine EG further increases after a vibration damping peak of the driven member 16 occurs in the vicinity of the anti-resonance point A, resonance occurs at the larger one of the two natural frequencies (in this embodiment, the resonance of the second intermediate member 14; see the resonance point R2 in FIG. 7). Therefore, the phase of the vibration transferred from the second inner springs SP12 to the driven member 16 is equal to the phase of the vibration transferred from the second outer springs SP22 to the driven member 16. That is, in the damper apparatus 10 of this embodiment, during a period from the time when the resonance occurs at the smaller one of the two natural frequencies described above (resonance of the first intermediate member 12) to the time when the resonance occurs at the larger one of the two natural frequencies (resonance of the second intermediate member 14), one of the vibration transferred from the second inner springs SP12 to the driven member 16 and the vibration transferred from the second outer springs SP22 to the driven member 16 cancels out at least a part of the other. Thus, the spring rates (combined spring rates) $k_1$, $k_2$, $k_3$, $k_4$, and $k_5$ and the moments of inertia $J_{21}$ and $J_{22}$ are preferably selected and set so that the frequency of the resonance that occurs on the higher speed rotation side (higher frequency side) than the anti-resonance point A is larger. Thus, the resonance (resonance point R2) can be caused on a high rotation speed range side on which the vibration is difficult to be conspicuous. Accordingly, the vibration damping performance of the damper apparatus 10 in the low rotation speed range can further be improved.

In order to further improve the vibration damping performance of the damper apparatus 10 in the vicinity of the lock-up rotation speed Nlup, it is necessary to separate the lock-up rotation speed Nlup from the rotation speed of the engine EG corresponding to the resonance point R2 to the extent possible. Therefore, when the damper apparatus 10 is structured so as to satisfy Expression (19), the spring rates $k_1$, $k_2$, $k_3$, $k_4$, and $k_5$ and the moments of inertia $J_{21}$ and $J_{22}$ are preferably selected and set so as to satisfy Nlup $\leq$ (120/n)·fa (=Nea). Thus, the lock-up can be executed by the lock-up clutch 8 while the transfer of the vibration to the input shaft IS of the transmission TM is satisfactorily suppressed. In addition, the vibration from the engine EG can excellently be damped by the damper apparatus 10 immediately after the execution of the lock-up.

By designing the damper apparatus 10 based on the frequency fa at the anti-resonance point A as described above, the vibration damping performance of the damper apparatus 10 can excellently be improved. The researches and analyses conducted by the inventors demonstrate that, when the lock-up rotation speed Nlup is defined as a value of, for example, around 1000 rpm, excellent results are obtained in practical use by structuring the damper apparatus 10 so as to satisfy, for example, 900 rpm≤(120/n)·fa≤1200 rpm.

As can be understood from Expressions (13) and (14), the two natural frequencies $f_{21}$ and $f_{22}$ of the damper apparatus 10 are influenced by the moments of inertia $J_{21}$ and $J_{22}$ of both of the first and second intermediate members 12 and 14. That is, in the damper apparatus 10, the first intermediate member 12 and the second intermediate member 14 are coupled to each other via the intermediate springs SPm. Therefore, forces from the intermediate springs SPm (see outline arrows in FIG. 6) act on both of the first and second intermediate members 12 and 14. Thus, the vibration of the first intermediate member 12 and the vibration of the second intermediate member 14 interact with each other (both the vibrations influence each other). Through the interaction between the vibration of the first intermediate member 12 and the vibration of the second intermediate member 14, the natural frequencies $f_{21}$ and $f_{22}$ are influenced by the moments of inertia $J_{21}$ and $J_{22}$ of both of the first and second intermediate members 12 and 14. Thus, in the damper apparatus 10, the natural frequencies $f_{21}$ and $f_{22}$ and the frequency fa at the anti-resonance point A can be set while the increase in the weights, that is, the moments of inertia $J_{21}$ and $J_{22}$ of the first and second intermediate members 12 and 14 is suppressed so that the resonance at the smaller one of the two natural frequencies $f_{21}$ and $f_{22}$ is easily shifted to the low speed rotation side, that is, the non-lock-up range and the vibrations are canceled out more satisfactorily in the driven member 16 in a state in which the rotation speed of the driving member 11 is lower.

In the damper apparatus 10, the two natural frequencies $f_{21}$ and $f_{22}$ are influenced by the moments of inertia $J_{21}$ and $J_{22}$ of both of the first and second intermediate members 12 and 14. By adjusting the moments of inertia $J_{21}$ and $J_{22}$ of the first and second intermediate members 12 and 14, the natural frequency $f_{21}$ on the low speed rotation side (resonance point R1) can easily be shifted to a lower speed rotation side of the non-lock-up range as compared to the damper apparatus of the comparative example described above while the frequency fa at the anti-resonance point A is set approximately equal to a frequency fa' at an anti-resonance point of the damper apparatus of the comparative example as illustrated in FIG. 7. Thus, in the damper apparatus 10, the vibration level in the vicinity of the anti-resonance point A can further be reduced as compared to the damper apparatus of the comparative example (see a dashed line in FIG. 7). By further reducing the natural frequency $f_{21}$ on the low speed rotation side to further reduce the vibration level in the vicinity of the anti-resonance point A as described above, the lock-up rotation speed Nlup can be kept lower even when the order of the vibration from the engine EG decreases along with execution of a fewer-cylinder operation of the engine EG having a cylinder halting function.

The analyses conducted by the inventors prove that the vibrations transferred from the first, second, and third torque transfer paths P1, P2, and P3 described above to the driven member 16 are easily canceled out by coupling the first and second intermediate members 12 and 14 to each other via the intermediate springs SPm and causing both the vibrations to interact with each other, whereby an actual vibration amplitude of the driven member 16 in the vicinity of the anti-resonance point A can further be reduced and a difference in the torque amplitude (torque fluctuation) between the second inner springs SP12 and the second outer springs SP22 can be reduced (both the torque amplitudes can be made closer). Thus, in the damper apparatus 10, the lock-up (coupling between the engine EG and the driving member 11) can be permitted at a lower rotation speed, and the vibration damping performance in the low rotation speed range in which the vibration from the engine EG is likely to increase can further be improved.

When $k_5=0$ is set in Expression (13) above, a natural frequency $f_{21}'$ of a first intermediate member of the damper apparatus of the comparative example from which the intermediate springs SPm are omitted is represented by Expression (20) below. When $k_5=0$ is set in Expression (14) above, a natural frequency $f_{22}'$ of a second intermediate member of the damper apparatus of the comparative example is represented by Expression (21) below. As can be understood from Expressions (20) and (21), in the damper apparatus of the comparative example, the natural frequency $f_{21}'$ of the first intermediate member is not influenced by the moment of inertia $J_{22}$ of the second intermediate member, and the natural frequency $f_{22}'$ of the second intermediate member is not influenced by the moment of inertia $J_{21}$ of the first intermediate member. In this regard, it is understood that, in the damper apparatus 10, the degrees of freedom in terms of setting of the natural frequencies $f_{21}$ and $f_{22}$ of the first and second intermediate members 12 and 14 can be improved as compared to the damper apparatus of the comparative example.

[Math. 10]

$$f_{21}' = \frac{1}{2\pi}\sqrt{\frac{k_1 + k_2}{J_{21}}} \qquad (20)$$

$$f_{22}' = \frac{1}{2\pi}\sqrt{\frac{k_1 + k_2}{J_{21}}} \qquad (21)$$

When $k_5=0$ is set in Expression (6) above, the frequency fa' at the anti-resonance point of the damper apparatus of the comparative example is represented by Expression (22) below. Comparing Expression (6) and Expression (22), when the spring rates $k_1$, $k_2$, $k_3$, and $k_4$ and the moments of inertia $J_{21}$ and $J_{22}$ are the same, the frequency fa' at the anti-resonance point of the damper apparatus of the comparative example is smaller than the frequency fa at the anti-resonance point A of the damper apparatus 10. In the damper apparatus 10, the frequency fa can easily be set approximately equal to the frequency fa' at the anti-resonance point of the damper apparatus of the comparative example (see the dashed line in FIG. 7) by mainly selecting the moments of inertia $J_{21}$ and $J_{22}$ of the first and second intermediate members 12 and 14 as appropriate.

[Math. 11]

$$fa' = \frac{1}{2\pi}\sqrt{\frac{k_1k_2k_3 + k_1k_2k_4 + k_1k_3k_4 + k_2k_3k_4}{J_{21}k_3k_4 + J_{22}k_1k_2}} \quad (22)$$

In the damper apparatus 10 described above, the first and second outer springs SP21 and SP22 corresponding to the second intermediate member 14 having a natural frequency larger than that of the first intermediate member 12 are disposed on the radially outer side of the first and second inner springs SP11 and SP12 corresponding to the first intermediate member 12. That is, the average attachment radius ro of the first and second outer springs SP21 and SP22 is larger than the average attachment radius ri of the first and second inner springs SP11 and SP12 corresponding to the first intermediate member 12. Thus, the torsion angles (strokes) of the first and second outer springs SP21 and SP22 having high stiffnesses can further be increased. Accordingly, the stiffnesses of the first and second outer springs SP21 and SP22 can be reduced while the transfer of a large torque to the driving member 11 is permitted. As a result, the equivalent stiffness $k_{eq}$ of the damper apparatus 10 can further be reduced, and the resonance of the entire vibration system including the damper apparatus 10, that is, the resonance caused by the vibration between the entire damper apparatus 10 and the drive shafts of the vehicle (resonance caused by the vibration that occurs between the driving member and the drive shafts) can be shifted to a lower speed rotation side (lower frequency side). Thus, in the damper apparatus 10, the vibration damping performance can excellently be improved such that the frequency at the anti-resonance point A described above is made closer to the frequency of the resonance of the entire vibration system.

In the damper apparatus 10 of the starting apparatus 1, the first and second outer springs SP21 and SP22 (third and fourth elastic bodies) are disposed on the outer side of the first and second inner springs SP11 and SP12 (first and second elastic bodies) in the radial direction of the damper apparatus 10. The intermediate springs SPm are disposed on the radially outer side of the first and second inner springs SP11 and SP12 with distances from the first and second outer springs SP21 and SP22 in the axial direction (so as to be close to the turbine runner 5). That is, when the starting apparatus 1 is cut along a plane including the central axis CA, the first and second inner springs SP11 and SP12, the first and second outer springs SP21 and SP22, and the intermediate springs SPm are included in a region having a shape of a triangle (inverted triangle) defined between the turbine runner 5 and the lock-up clutch 8 (first and second friction engagement plates 83 and 84 serving as the friction engagement portions) in the axial direction such that a vertex opposite to the shortest side is located on the central axis CA side. More specifically, as illustrated in FIG. 2, the first and second outer springs SP21 and SP22 are disposed in the vicinity of one vertex on the shortest side of the triangle, the intermediate springs SPm are disposed in the vicinity of the other vertex on the shortest side, and the first and second inner springs SP11 and SP12 are disposed in the vicinity of the vertex opposite to the shortest side.

Figure 14:
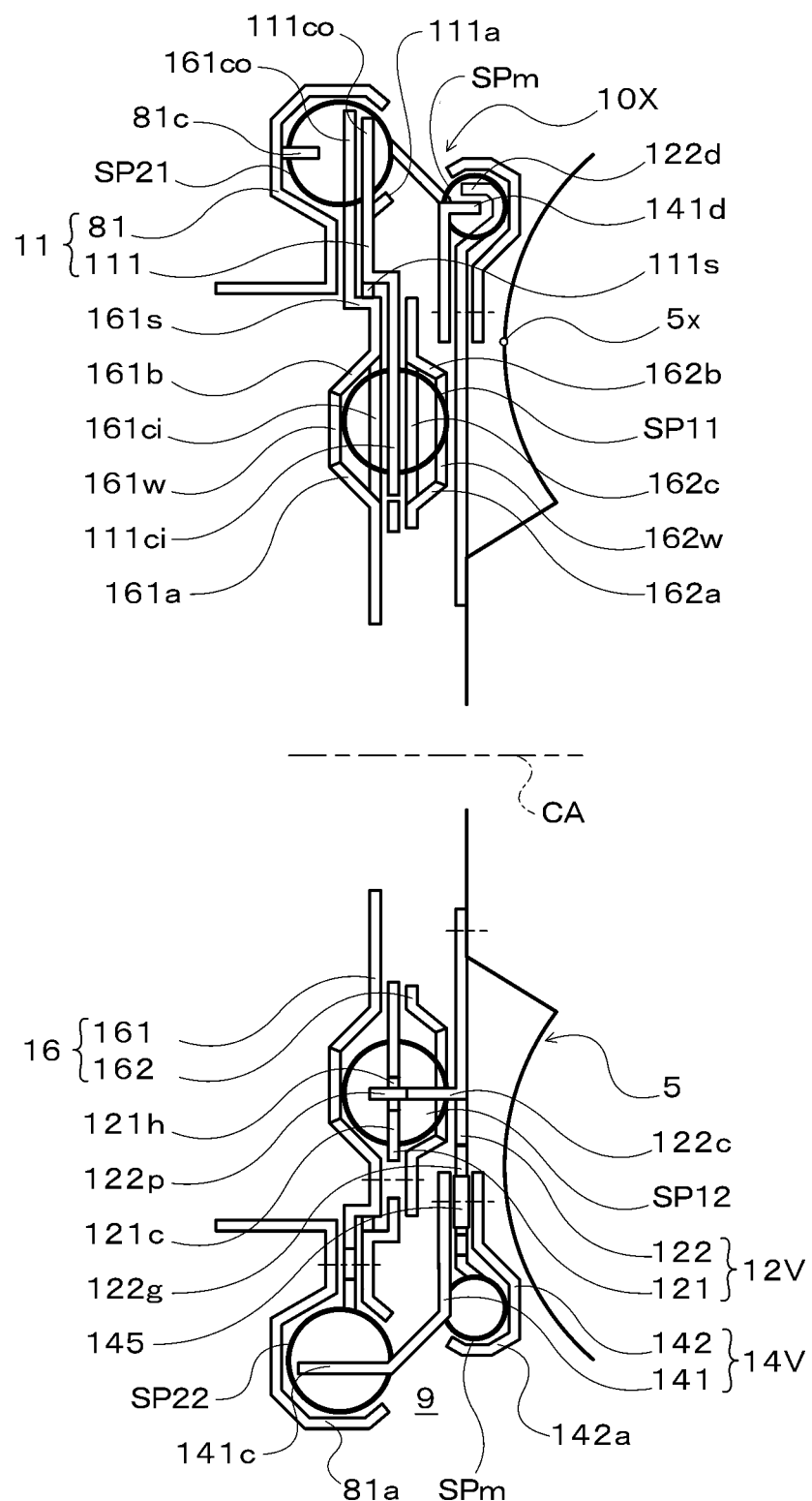
FIG. 14 is a sectional view illustrating another starting apparatus disclosed herein.

Thus, it is possible to increase the degrees of freedom in terms of setting of the stiffnesses, the numbers of arrangement, the torsion angles (strokes), and the like of the first and second inner springs SP11 and SP12, the first and second outer springs SP21 and SP22, and the intermediate springs SPm, and to suppress the increase in the size of the starting apparatus 1 along with the arrangement of the intermediate springs SPm by effectively using the space in the starting apparatus 1. As a result, the vibration damping performance of the damper apparatus 10 can further be improved by easily and appropriately setting the two natural frequencies described above (natural frequencies $f_{21}$ and $f_{22}$ of the first and second intermediate members 12 and 14) while the increase in the size of the starting apparatus 1 is suppressed. As in a damper apparatus 10X illustrated in FIG. 14, the intermediate springs SPm may be disposed between the first and second outer springs SP21 and SP22 and the first and second inner springs SP11 and SP12 in the radial direction of the damper apparatus 10X. That is, the intermediate springs SPm may be disposed on the radially outer side of the first and second inner springs SP11 and SP12 and on the radially inner side of the first and second outer springs SP21 and SP22 with distances from the first and second outer springs SP21 and SP22 in an axial direction of the damper apparatus 10X. In this case, as in the illustration, the intermediate springs SPm may be disposed so as to partially overlap at least one of the first and second outer springs SP21 and SP22 in the axial direction as viewed in the radial direction. Further, the intermediate springs SPm may be disposed so as to partially overlap at least one of the first and second inner springs SP11 and SP12 in the axial direction as viewed in the radial direction.

In the damper apparatus 10, the first intermediate member 12 includes the first and second plate members 121 and 122 that are two members coupled to each other. The coupling abutment portions 122c (first abutment portions) each abutting against the ends of the first and second inner springs SP11 and SP12 between the first and second inner springs SP11 and SP12 and the outer abutment portions 122d (second abutment portions) each abutting against the end of the intermediate spring SPm are both formed on the second plate member 122 that is one of the two members. Similarly, the second intermediate member 14 of the damper apparatus 10 includes the first and second annular members 141 and 142 that are two members coupled to each other. The first spring abutment portions 141c (first abutment portions) each abutting against the ends of the first and second outer springs SP21 and SP22 between the first and second outer springs SP21 and SP22 and the second spring abutment portions 141d (second abutment portions) each abutting against the end of the intermediate spring SPm are both formed on the first annular member 141 that is one of the two members. Thus, it is possible to reduce the shear forces acting on the fitting portions of the spring abutment portions 121c of the first plate member 121 and the coupling abutment portions 122c of the second plate member 122 and on the coupling portions of the first and second annular members 141 and 142. Accordingly, it is possible to further improve the durability of the fitting portions and the coupling portions and furthermore the durability of the first and second intermediate members 12 and 14.

In the damper apparatus 10, both of the spring abutment portion 121c of the first plate member 121 that extends in the radial direction of the damper apparatus 10 and the coupling abutment portion 122c of the second plate member 122 that extends in the axial direction of the damper apparatus 10 abut against the ends of the first and second inner springs SP11 and SP12 between the first and second inner springs SP11 and SP12. Thus, the first and second inner springs SP11 and SP12 can appropriately be pressed by the first intermediate member 12 so as to extend and contract along the axis center. Accordingly, the vibration damping performance of the damper apparatus 10 can further be improved.

By causing both of the spring abutment portion 121c and the coupling abutment portion 122c to abut against the ends of the first and second inner springs SP11 and SP12 between the first and second inner springs SP11 and SP12, the spring abutment portion 121c and the coupling abutment portion 122c are supported from both sides by the first and second inner springs SP11 and SP12. Therefore, there is no need to tighten the fitting of the first plate member 121 and the second plate member 122. Thus, the coupling abutment portion 122c can easily be fitted to the spring abutment portion 121c. Accordingly, the assembling workability of the damper apparatus 10 can be secured satisfactorily.

In the damper apparatus 10, the moment of inertia $J_{21}$ of the first intermediate member 12 (first and second plate members 121 and 122) is set larger than the moment of inertia $J_{22}$ of the second intermediate member 14. Thus, the natural frequency $f_{21}$ on the low frequency side is further reduced. Accordingly, the resonance point of the first intermediate member 12 can be set to a lower speed rotation side (lower frequency side). In addition, the first intermediate member 12 is coupled to the turbine runner 5 so as to rotate together with the turbine runner 5. Thus, a substantial moment of inertia of the first intermediate member 12 (sum of the moments of inertia of the first and second plate members 121 and 122, the turbine runner 5, the turbine hub 52, and the like) can further be increased. Instead of coupling the turbine runner 5 to the first intermediate member 12, that is, the second plate member 122, a weight (dedicated weight) other than the turbine runner may be coupled.

In the damper apparatus 10 described above, the natural frequency of the second intermediate member 14 corresponding to the first and second outer springs SP21 and SP22 disposed on the radially outer side of the first and second inner springs SP11 and SP12 may be set smaller than the natural frequency of the first intermediate member 12. That is, the natural frequency of the second intermediate member 14 may be defined based on Expression (13) above, and the natural frequency of the first intermediate member 12 may be defined based on Expression (14) above. In this case, it is appropriate that the smaller one of the spring rates $k_{21}$ and $k_{22}$ of the first and second outer springs SP21 and SP22 be set smaller than the smaller one of the spring rates $k_{11}$ and $k_{12}$ of the first and second inner springs SP11 and SP12. That is, in this case, it is appropriate that the spring rates $k_{11}$, $k_{12}$, $k_{21}$, and $k_{22}$ be selected so as to satisfy relationships of $k_{21} \neq k_{11}$ and $k_{21}/k_{11} \neq k_{22}/k_{12}$. More specifically, it is appropriate that the spring rates $k_{11}$, $k_{12}$, $k_{21}$, $k_{22}$, and $k_m$ be selected so as to satisfy relationships of $k_{21}/k_{11} < k_{22}/k_{12}$ and $k_{21} < k_m < k_{22} < k_{12} < k_1$.

In the damper apparatus 10 structured as described above, the average attachment radius ro of the first and second outer springs SP21 and SP22 corresponding to the second intermediate member 14 having a natural frequency smaller than that of the first intermediate member 12 is larger than the average attachment radius ri of the first and second inner springs SP11 and SP12. Thus, it is possible to further increase the moment of inertia $J_{22}$ of the second intermediate member 14, and to further reduce the stiffnesses of the first and second outer springs SP21 and SP22. In this case, the first and second outer springs SP21 and SP22 having low stiffnesses and relatively small weights are disposed on the outer peripheral side of the damper apparatus 10, and the first and second inner springs SP11 and SP12 having high stiffnesses and relatively large weights are disposed on the central axis CA side of the damper apparatus 10. Thus, the hysteresis of the first and second outer springs SP21 and SP22 on the outer peripheral side can be reduced by reducing the weights of the first and second outer springs SP21 and SP22 along with the reduction in the stiffnesses. Further, the hysteresis of the first and second inner springs SP11 and SP12 on the inner peripheral side can be reduced by reducing a centrifugal force acting on the first and second inner springs SP11 and SP12. Thus, in the damper apparatus 10, the frictional force generated between the springs SP11, SP12, SP21, and SP22 and the respective rotational elements due to the centrifugal force is reduced. Accordingly, the hysteresis of the entire damper apparatus 10 can further be reduced. As a result, in the damper apparatus 10, the vibration damping performance can excellently be improved such that the frequency at the anti-resonance point A described above is made closer to the frequency of the vibration (resonance) to be damped.

In the damper apparatus 10 described above, the spring rate $K_{21}$ of the first outer spring SP21 is larger than the spring rate $K_{22}$ of the second outer spring SP22 ($k_{22} < k_{21}$). The present disclosure is not limited to this case. That is, in order to facilitate the designing of the damper apparatus 10, specifications such as the spring rate $K_{21}$, the coil diameter, and the axial length of the first outer spring SP21 may be set identical to specifications such as the spring rate $K_{22}$, the coil diameter, and the axial length of the second outer spring SP22 ($k_{21} = k_{22}$). Similarly, specifications such as the spring rate $K_{11}$, the coil diameter, and the axial length of the first inner spring SP11 may be set identical to specifications such as the spring rate $K_{12}$, the coil diameter, and the axial length of the second inner spring SP12 ($k_{11} = k_{12}$). When the natural frequency of the second intermediate member 14 is smaller than the natural frequency of the first intermediate member 12, the spring rates $k_{11}$, $k_{12}$, $k_{21}$, and $k_{22}$ may be selected so as to satisfy a relationship of $k_{21} < k_{22} < k_{12} = k_{11}$.

In the damper apparatus 10, the spring rate $k_m$ of the intermediate spring SPm may be defined as being smaller than the spring rates $k_{11}$, $k_{12}$, $k_{21}$, and $k_{22}$ of the first and second inner springs SP11 and SP12 and the first and second outer springs SP21 and SP22. That is, as described above, the natural frequency $f_{21}$ on the low speed rotation side (low frequency side) and the frequency fa at the anti-resonance point A decrease as the combined spring rate $k_5$ of the intermediate springs SPm decreases (see FIG. 12). Thus, when the spring rate (stiffness) $k_m$ of the intermediate spring SPm is set smaller than the spring rates $k_{11}$, $k_{12}$, $k_{21}$, and $k_{22}$, the natural frequency $f_{21}$ and the frequency fa can further be reduced. Even when this structure is employed, the start point of the rotation speed band in which one of the vibration transferred from the second inner springs SP12 to the driven member 16 and the vibration transferred from the second outer springs SP22 to the driven member 16 cancels out at least a part of the other can be set to a lower speed rotation side. By setting the start point of the rotation speed band to the low speed rotation side, the rotation speed (frequency) at which the phase of the vibration transferred from the second inner springs SP12 to the driven member 16 deviates by 180 degrees from the phase of the vibration transferred from the second outer springs SP22 to the driven member 16 can also be set to the low speed rotation side (low frequency side). In this case, it is appropriate that the spring rates $k_{11}$, $k_{12}$, $k_{21}$, and $k_{22}$ of the first and second inner springs SP11 and SP12 and the first and second outer springs SP21 and SP22 satisfy at least the relationships of $k_{11} \neq k_{21}$ and $k_{11}/k_{21} \neq k_{12}/k_{22}$.

In the damper apparatus 10, the spring rate $k_m$ of the intermediate spring SPm may be defined as being larger than the spring rates $k_{11}$, $k_{12}$, $k_{21}$, and $k_{22}$ of the first and second inner springs SP11 and SP12 and the first and second outer springs SP21 and SP22. That is, as described above, the difference between the natural frequency $f_{21}$ on the low speed rotation side (low frequency side) and the frequency fa at the anti-resonance point A (fa–$f_{21}$) increases as the combined spring rate $k_5$ of the intermediate springs SPm increases (see FIG. 12). Thus, when the spring rate (stiffness) $k_m$ of the intermediate spring SPm is set larger than the spring rates $k_{11}$, $k_{12}$, $k_{21}$, and $k_{22}$, the difference between the natural frequency $f_2$, and the frequency fa (fa–$f_{21}$) is increased. Accordingly, it is possible to further extend the rotation speed band in which one of the vibration transferred from the second inner springs SP12 to the driven member 16 and the vibration transferred from the second outer springs SP22 to the driven member 16 cancels out at least a part of the other, that is, the range in which the vibration level of the driven member 16 can be reduced satisfactorily.

In this case, it is appropriate that the spring rates $k_{11}$, $k_{12}$, $k_{21}$, and $k_{22}$ of the first and second inner springs SP11 and SP12 and the first and second outer springs SP21 and SP22 be adjusted so that the natural frequency $f_{21}$ and the frequency fa at the anti-resonance point A are further reduced and the difference therebetween (fa–$f_{21}$) is further increased. It is advantageous that this structure be applied to a damper apparatus in which the maximum torque input to the driving member 11 is relatively small and the required equivalent stiffness $k_{eq}$ is relatively low from the viewpoint of ease of numerical value setting for the spring rates $k_{11}$, $k_{12}$, $k_{21}$, and $k_{22}$ that is made in order to further reduce the natural frequency $f_{21}$ and the frequency fa at the anti-resonance point A. In this case as well, it is appropriate that the spring rates $k_{11}$, $k_{12}$, $k_{21}$, and $k_{22}$ of the first and second inner springs SP11 and SP12 and the first and second outer springs SP21 and SP22 satisfy at least the relationships of $k_{11} \ne k_{21}$ and $k_{11}/k_{21} \ne k_{12}/k_{22}$.

When the damper apparatus 10 includes an even number of intermediate springs SPm, two intermediate springs SPm may be supported from both sides in the circumferential direction by a pair of abutment portions provided on one of the first and second intermediate members 12 and 14, and an abutment portion provided on the other one of the first and second intermediate members 12 and 14 may abut against the ends of the two intermediate springs SPm between the two intermediate springs SPm.

In addition to the first, second, and third torque transfer paths P1, P2, and P3, the damper apparatus 10 may further include, for example, at least one torque transfer path provided in parallel to the first and second torque transfer paths P1 and P2. Further, at least one set of an intermediate member and springs (elastic bodies) may be added to, for example, at least one of the first and second torque transfer paths P1 and P2 of the damper apparatus 10.

In the starting apparatus 1, when slip control is executed so that an actual slip speed (actual rotation speed difference) between the engine EG and the input shaft of the transmission TM (driving member 11) is caused to coincide with a target slip speed, the frequency fa at the anti-resonance point A described above may be caused to coincide with a frequency fs of a shudder that occurs when the slip control is executed, or may be set to a value in the vicinity of the frequency fs of the shudder. Thus, it is possible to further reduce the shudder that occurs when the slip control is executed. When "$J_{pd}$" represents a moment of inertia of the lock-up piston 80 and the driving member 11 that rotate together, the frequency fs of the shudder can be represented by fs=½π*√($k_{eq}/J_{pd}$) by using the moment of inertia $J_{pd}$ and the equivalent stiffness $k_{eq}$ of the damper apparatus 10.

Unillustrated spring seats may be attached to the ends of the springs SP11 to SPm described above. That is, the "abutment portion (spring abutment portion)" of the damper apparatus 10 may be a portion abutting against the spring seat that is substantially a part of the springs SP11 to SPm. The "abutment portion" of the damper apparatus 10 may also be a "torque transfer portion" configured to exchange a torque with a corresponding spring (elastic body) (the same applies hereinafter).

Figure 15:
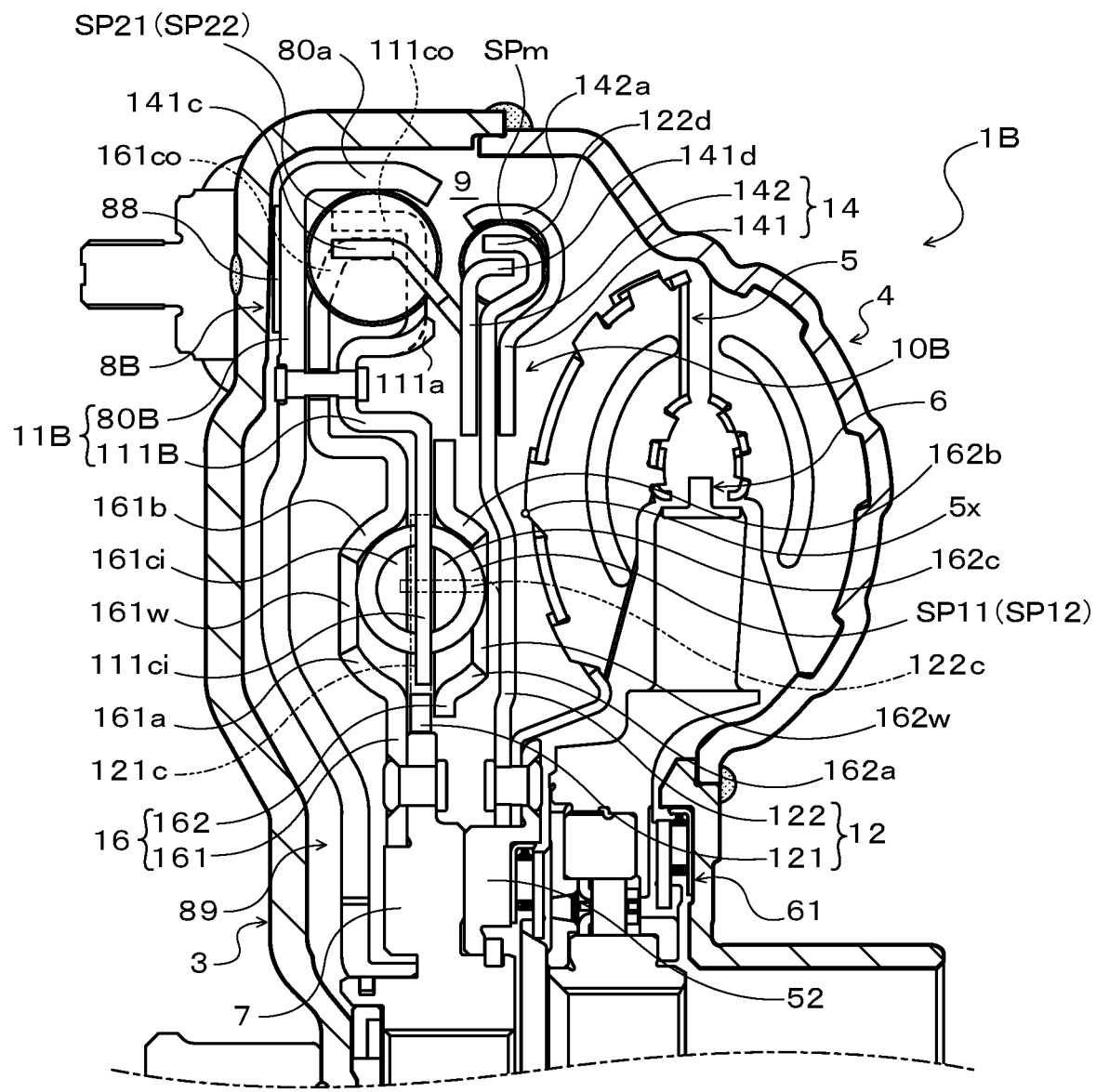
FIG. 15 is a sectional view illustrating still another starting apparatus disclosed herein.

FIG. 15 is a sectional view illustrating a starting apparatus 1B including another damper apparatus 10B disclosed herein. The same components of the starting apparatus 1B and the damper apparatus 10B as the components of the starting apparatus 1 and the damper apparatus 10 described above are represented by the same reference symbols to omit redundant description.

The starting apparatus 1B illustrated in FIG. 15 includes a lock-up clutch 8B structured as a single-plate hydraulic clutch. The lock-up clutch 8B includes a lock-up piston 80B disposed inside the front cover 3 and in the vicinity of the inner wall surface of the front cover 3 on the engine EG side and fitted to the damper hub 7 in a freely rotatable and axially movable manner. A friction material 88 is attached to a surface of the lock-up piston 80B on the outer peripheral side and on the front cover 3 side. A lock-up chamber 89 connected to the unillustrated hydraulic controller via a hydraulic oil supply passage and an oil passage formed in the input shaft IS is defined between the lock-up piston 80B and the front cover 3. In the starting apparatus 1B, the hydraulic pressure in the fluid chamber 9 is set higher than the hydraulic pressure in the lock-up chamber 89 by the unillustrated hydraulic controller to engage the lock-up clutch 8B. Thus, the front cover 3 and the damper hub 7 can be coupled to each other via the damper apparatus 10. Further, the hydraulic pressure in the lock-up chamber 89 is set higher than the hydraulic pressure in the fluid chamber 9 by the unillustrated hydraulic controller to release the lock-up clutch 8B. Thus, the front cover 3 and the damper hub 7 can be decoupled from each other.

As illustrated in FIG. 15, a driving member 11B of the damper apparatus 10B includes the lock-up piston 80B (first input member) of the lock-up clutch 8B to which the torque from the engine EG is transferred, and an annular input plate 111B (second input member) coupled to the lock-up piston 80B via a plurality of rivets. Thus, the front cover 3 (engine EG) and the driving member 11B of the damper apparatus 10B are coupled to each other through the engagement of the lock-up clutch 8B.

The lock-up piston 80B includes a spring support portion 80a formed on an outer peripheral portion, and a plurality of (for example, three in this embodiment) unillustrated spring abutment portions (elastic body abutment portions). As in the illustration, the spring support portion 80a is disposed in the outer peripheral region of the fluid chamber 9, and supports (guides) the outer portions of the plurality of first and second outer springs SP21 and SP22 in the radial direction, front-cover-3-side (engine side) lateral portions (lateral portions on the left side in FIG. 15) thereof, and outer sides (shoulder portions) of turbine-runner-5-side (transmission side) lateral portions thereof in the radial direction. The input plate 111B is a plate-shaped annular member including the plurality of (for example, three in this embodiment) spring support portions 111a, the plurality of (for example, three in this embodiment) outer spring abutment portions (elastic body abutment portions) 111co, and the plurality of (for example, three in this embodiment) inner spring abutment portions (elastic body abutment portions) 111ci. As in the illustration, the input plate 111B further includes an annular coupling portion formed so as to protrude toward the lock-up piston 80B. A plurality of rivets are inserted through the coupling portion.

The first intermediate member 12 of the damper apparatus 10B is basically structured similarly to the first intermediate member 12 of the damper apparatus 10 described above, and includes the first plate member 121 and the second plate member 122. The second intermediate member 14 of the damper apparatus 10B is basically structured similarly to the second intermediate member 14 of the damper apparatus 10 described above, and includes the first and second annular members 141 and 142. The second intermediate member 14 of the damper apparatus 10B also has a moment of inertia smaller than that of the first intermediate member 12. The driven member 16 of the damper apparatus 10B is basically structured similarly to the driven member 16 of the damper apparatus 10 described above, and includes the first and second output plates 161 and 162. As in the illustration, the driven member 16 of the damper apparatus 10B is formed so as not to interfere with the plurality of rivets that couple the lock-up piston 80B and the input plate 111B to each other.

Also in the damper apparatus 10B structured as described above, the first and second inner springs SP11 and SP12, the first and second outer springs SP21 and SP22, and the intermediate springs SPm are basically disposed in the fluid chamber 9 similarly to the damper apparatus 10. Further, the first and second intermediate members 12 and 14 of the damper apparatus 10B are basically structured similarly to those of the damper apparatus 10 described above. Thus, the starting apparatus 1B and the damper apparatus 10B can also attain actions and effects similar to those of the starting apparatus 1 and the damper apparatus 10.

In the damper apparatus 10B, the first and second inner springs SP11 and SP12 are disposed on an inner side in the radial direction with respect to the friction engagement portion, that is, the friction material 88 of the lock-up clutch 8B, and the first and second outer springs SP21 and SP22 are disposed so as to at least partially overlap the friction material 88 (friction engagement portion) in the radial direction as viewed in the axial direction. Thus, the vibration damping performance of the damper apparatus 10B can further be improved by increasing the degrees of freedom in terms of setting of the spring rates $k_{21}$ and $k_{22}$, the numbers of arrangement, the torsion angles (strokes), and the like of the first and second outer springs SP21 and SP22 while the axial length of the damper apparatus 10B and furthermore the axial length of the starting apparatus 1B are further reduced.

As described above, the damper apparatus disclosed herein is the damper apparatus (10, 10X, 10B) including the input element (11, 11B) to which the torque from the engine (EG) is transferred, and the output element (16). The damper apparatus includes the first intermediate element (12), the second intermediate element (14), the first elastic body (SP11) configured to transfer the torque between the input element (11, 11B) and the first intermediate element (12), the second elastic body (SP12) configured to transfer the torque between the first intermediate element (12) and the output element (16), the third elastic body (SP21) configured to transfer the torque between the input element (11, 11B) and the second intermediate element (14), the fourth elastic body (SP22) configured to transfer the torque between the second intermediate element (14) and the output element (16), and the fifth elastic body (SPm) configured to transfer the torque between the first intermediate element (12) and the second intermediate element (14). The third and fourth elastic bodies (SP21, SP22) are disposed on the outer side of the first and second elastic bodies (SP11, SP12) in the radial direction of the damper apparatus (10, 10X, 10B). The fifth elastic body (SPm) is disposed on the outer side of the first and second elastic bodies (SP11, SP12) in the radial direction with a distance from the third and fourth elastic bodies (SP21, SP22) in the axial direction of the damper apparatus (10, 10X, 10B), and at least partially overlaps the third and fourth elastic bodies (SP21, SP22) in the radial direction as viewed in the axial direction.

In the damper apparatus disclosed herein, two natural frequencies can be set as a whole in the state in which the deflections of all of the first to fifth elastic bodies are permitted. The two natural frequencies are appropriately set by adjusting the stiffness of the fifth elastic body. Thus, the vibration damping performance of the damper apparatus can be improved. The fifth elastic body is disposed on the outer side of the first and second elastic bodies in the radial direction with a distance from the third and fourth elastic bodies in the axial direction of the damper apparatus, and at least partially overlaps the third and fourth elastic bodies in the radial direction of the damper apparatus as viewed in the axial direction. Therefore, the degrees of freedom in terms of setting of the stiffnesses, the numbers of arrangement, the torsion angles (strokes), and the like of the first to fifth elastic bodies are increased. Thus, the two natural frequencies described above can be set easily and appropriately, and accordingly the vibration damping performance can further be improved. In the damper apparatus, the increase in the size of the damper apparatus along with the arrangement of the fifth elastic body can be suppressed by effectively using the space.

The fifth elastic body (SPm) may be disposed on the inner side of the third and fourth elastic bodies (SP21, SP22) in the radial direction.

The third and fourth elastic bodies (SP21, SP22) may be disposed so as to at least partially overlap at least one of the first and second elastic bodies (SP11, SP12) in the axial direction as viewed in the radial direction. Thus, the axial length of the damper apparatus and furthermore the axial length of the starting apparatus can further be reduced.

The fifth elastic body (SPm) may be disposed so as to at least partially overlap at least one of the first and second elastic bodies (SP11, SP12) in the axial direction as viewed in the radial direction. Thus, the axial length of the damper apparatus and furthermore the axial length of the starting apparatus can further be reduced.

The first and second elastic bodies (SP11, SP12) may be arranged on the first circumference, and the third and fourth elastic bodies (SP21, SP22) may be arranged on the second circumference having a diameter larger than that of the first circumference. Thus, the damper apparatus can be made compact in the radial direction.

The natural frequency of the second intermediate element (14) may be larger than the natural frequency of the first intermediate element (12). In the damper apparatus in which the third and fourth elastic bodies corresponding to the second intermediate element having a natural frequency larger than that of the first intermediate element are disposed on the radially outer side of the first and second elastic bodies, the torsion angles (strokes) of the third and fourth elastic bodies can further be increased. Accordingly, the stiffnesses of the third and fourth elastic bodies can further be reduced while the transfer of a large torque to the input element is permitted. As a result, the equivalent stiffness of the damper apparatus can further be reduced, and the vibration damping performance can further be improved.

The smaller one of the stiffness ($k_{11}$) of the first elastic body (SP11) and the stiffness ($k_{12}$) of the second elastic body (SP12) may be smaller than the smaller one of the stiffness ($k_{21}$) of the third elastic body (SP21) and the stiffness ($k_{22}$) of the fourth elastic body (SP22). Thus, the natural frequency of the first intermediate element can further be reduced, and the equivalent stiffness of the damper apparatus can further be reduced.

The natural frequency of the second intermediate element (14) may be smaller than the natural frequency of the first intermediate element (12). In the damper apparatus in which the third and fourth elastic bodies corresponding to the second intermediate element having a natural frequency smaller than that of the first intermediate element are disposed on the radially outer side of the first and second elastic bodies, the natural frequency of the second intermediate element is further reduced, and the hysteresis of the entire damper apparatus is further reduced. Accordingly, the vibration damping performance can further be improved.

The smaller one of the stiffness ($k_{21}$) of the third elastic body (SP21) and the stiffness ($k_{22}$) of the fourth elastic body (SP22) may be smaller than the smaller one of the stiffness ($k_{11}$) of the first elastic body (SP11) and the stiffness ($k_{12}$) of the second elastic body (SP12). Thus, the natural frequency of the second intermediate element can further be reduced, and the hysteresis of the entire damper apparatus can further be reduced.

It is appropriate to prevent the deflections of the first to fifth elastic bodies (SP11, SP12, SP21, SP22, SPm) from being restricted until the input torque (T) transferred to the input element (11, 11B) is equal to or larger than the predetermined threshold (T1). Thus, the vibration damping performance of the damper apparatus when the input torque transferred to the input element is relatively small and the rotation speed of the input element is low can satisfactorily be improved.

The output element (16) may actively (directly or indirectly) be coupled to the input shaft (IS) of the transmission (TM).

The starting apparatus disclosed herein is the starting apparatus (1, 1B) including the pump impeller (4), the turbine runner (5), and the damper apparatus (10, 10X, 10B) including the input element (11, 11B) to which the torque from the engine (EG) is transferred, and the output element (16). The damper apparatus (10, 10X, 10B) includes the first intermediate element (12), the second intermediate element (14), the first elastic body (SP11) configured to transfer the torque between the input element (11, 11B) and the first intermediate element (12), the second elastic body (SP12) configured to transfer the torque between the first intermediate element (12) and the output element (16), the third elastic body (SP21) configured to transfer the torque between the input element (11, 11B) and the second intermediate element (14), the fourth elastic body (SP22) configured to transfer the torque between the second intermediate element (14) and the output element (16), and the fifth elastic body (SPm) configured to transfer the torque between the first intermediate element (12) and the second intermediate element (14). The third and fourth elastic bodies (SP21, SP22) are disposed on the outer side of the first and second elastic bodies (SP11, SP12) in the radial direction of the damper apparatus (10, 10X, 10B). The fifth elastic body (SPm) is disposed on the outer side of the first and second elastic bodies (SP11, SP12) in the radial direction so as to be closer to the turbine runner (5) than the first, second, third, and fourth elastic bodies (SP11, SP12, SP21, SP22) in the axial direction of the damper apparatus (10, 10X, 10B).

In the damper apparatus of the starting apparatus disclosed herein, two natural frequencies can be set as a whole in the state in which the deflections of all of the first to fifth elastic bodies are permitted. The two natural frequencies are appropriately set by adjusting the stiffness of the fifth elastic body. Thus, the vibration damping performance of the damper apparatus can be improved. In the damper apparatus of the starting apparatus disclosed herein, the third and fourth elastic bodies are disposed on the outer side of the first and second elastic bodies in the radial direction of the damper apparatus, and the fifth elastic body is disposed on the outer side of the first and second elastic bodies in the radial direction so as to be closer to the turbine runner than the first, second, third, and fourth elastic bodies in the axial direction of the damper apparatus. Therefore, the degrees of freedom in terms of setting of the stiffnesses, the numbers of arrangement, the torsion angles (strokes), and the like of the first to fifth elastic bodies are increased. Thus, the two natural frequencies described above can be set easily and appropriately, and accordingly the vibration damping performance of the damper apparatus can further be improved. In the starting apparatus, the increase in the size of the apparatus along with the arrangement of the fifth elastic body can be suppressed by effectively using the space.

The fifth elastic body (SPm) may be disposed on the inner side of the third and fourth elastic bodies (SP21, SP22) in the radial direction.

The third and fourth elastic bodies (SP21, SP22) may be disposed so as to at least partially overlap at least one of the first and second elastic bodies (SP11, SP12) in the axial direction as viewed in the radial direction. Thus, the axial length of the damper apparatus and furthermore the axial length of the starting apparatus can further be reduced.

The fifth elastic body (SPm) may be disposed so as to at least partially overlap at least one of the first and second elastic bodies (SP11, SP12) in the axial direction as viewed in the radial direction. Thus, the axial length of the damper apparatus and furthermore the axial length of the starting apparatus can further be reduced.

The fifth elastic body (SPm) may be disposed so as to at least partially overlap the turbine runner (5) in the radial direction as viewed in the axial direction. Thus, the space usage of the entire starting apparatus can be improved by effectively using, as an arrangement space for the fifth elastic body, the region in the vicinity of the outer peripheral portion of the turbine runner that is likely to be a dead space.

The first and second elastic bodies (SP11, SP12) may be disposed on the inner side in the radial direction with respect to the maximally bulging portion (5x) of the turbine runner (5) in the axial direction, and the third and fourth elastic bodies (SP21, SP22) may be disposed on the outer side in the radial direction with respect to the maximally bulging portion (5x) of the turbine runner (5). Thus, the axial length of the damper apparatus and furthermore the axial length of the starting apparatus can further be reduced.

The starting apparatus (1) may further include the multi-plate lock-up clutch (8). The third and fourth elastic bodies (SP21, SP22) may be disposed so as to at least partially overlap a part of the lock-up clutch (8) in the axial direction as viewed in the radial direction. Thus, the axial length of the damper apparatus and furthermore the axial length of the starting apparatus can further be reduced.

The starting apparatus (1) may further include the multi-plate lock-up clutch (8). The first and second elastic bodies (SP11, SP12) may be disposed so as to at least partially overlap the friction engagement portion (83, 84) of the lock-up clutch (8) in the radial direction as viewed in the axial direction. The third and fourth elastic bodies (SP21, SP22) may be disposed on the outer side in the radial direction with respect to the friction engagement portion (83, 84). Thus, the vibration damping performance of the damper apparatus can further be improved by reducing the hysteresis of the first and second elastic bodies while the axial length of the damper apparatus and furthermore the axial length of the starting apparatus are further reduced.

The starting apparatus (1B) may further include the single-plate lock-up clutch (8B). The first and second elastic bodies (SP11, SP12) may be disposed on the inner side in the radial direction with respect to the friction engagement portion (88) of the lock-up clutch (8). The third and fourth elastic bodies (SP21, SP22) may be disposed so as to at least partially overlap the friction engagement portion (88) in the radial direction as viewed in the axial direction. Thus, the vibration damping performance of the damper apparatus can further be improved by increasing the degrees of freedom in terms of setting of the stiffnesses, the numbers of arrangement, the torsion angles (strokes), and the like of the third and fourth elastic bodies while the axial length of the damper apparatus and furthermore the axial length of the starting apparatus are further reduced.

It is understood that the disclosure disclosed herein is not limited to the embodiment described above and various modifications may be made within the extensive scope of the disclosure. The embodiment described above is merely one specific mode of the disclosure described in the "SUMMARY" section, and is not intended to limit the elements of the disclosure described in the "SUMMARY" section.

INDUSTRIAL APPLICABILITY

The disclosure disclosed herein is applicable to, for example, the field of manufacture of a damper apparatus and a starting apparatus.

The invention claimed is:

1. A damper apparatus comprising:
   an input to which a torque from an engine is transferred;
   an output;
   a first intermediate element;
   a second intermediate element;
   a first elastic body configured to transfer the torque between the input and the first intermediate element;
   a second elastic body configured to transfer the torque between the first intermediate element and the output;
   a third elastic body configured to transfer the torque between the input and the second intermediate element;
   a fourth elastic body configured to transfer the torque between the second intermediate element and the output; and
   a fifth elastic body configured to transfer the torque between the first intermediate element and the second intermediate element, wherein
   the third and fourth elastic bodies are disposed on an outer side of the first and second elastic bodies in a radial direction of the damper apparatus, and
   the fifth elastic body is disposed on the outer side of the first and second elastic bodies in the radial direction with a distance from the third and fourth elastic bodies in an axial direction of the damper apparatus, and at least partially overlaps the third and fourth elastic bodies in the radial direction as viewed in the axial direction.

2. The damper apparatus according to claim 1, wherein the fifth elastic body is disposed on an inner side of the third and fourth elastic bodies in the radial direction.

3. The damper apparatus according to claim 1, wherein the third and fourth elastic bodies are disposed so as to at least partially overlap at least one of the first and second elastic bodies in the axial direction as viewed in the radial direction.

4. The damper apparatus according to claim 1, wherein the fifth elastic body is disposed so as to at least partially overlap at least one of the first and second elastic bodies in the axial direction as viewed in the radial direction.

5. The damper apparatus according to claim 1, wherein the first and second elastic bodies are arranged on a first circumference, and the third and fourth elastic bodies are arranged on a second circumference having a diameter larger than a diameter of the first circumference.

6. The damper apparatus according to claim 1, wherein a natural frequency of the second intermediate element is larger than a natural frequency of the first intermediate element.

7. The damper apparatus according to claim 1, wherein a smaller one of a stiffness of the first elastic body and a stiffness of the second elastic body is smaller than a smaller one of a stiffness of the third elastic body and a stiffness of the fourth elastic body.

8. The damper apparatus according to claim 1, wherein a natural frequency of the second intermediate element is smaller than a natural frequency of the first intermediate element.

9. The damper apparatus according to claim 1, wherein a smaller one of a stiffness of the third elastic body and a stiffness of the fourth elastic body is smaller than a smaller one of a stiffness of the first elastic body and a stiffness of the second elastic body.

10. The damper apparatus according to claim 1, wherein deflections of the first to fifth elastic bodies are not restricted until an input torque transferred to the input is equal to or larger than a predetermined threshold.

11. The damper apparatus according to claim 1, wherein the output is coupled to an input shaft of a transmission.

12. A starting apparatus, comprising
   a pump impeller;
   a turbine runner; and
   a damper apparatus, wherein the damper apparatus includes:
      an input to which a torque from an engine is transferred;
      an output;
      a first intermediate element;
      a second intermediate element;
      a first elastic body configured to transfer the torque between the input and the first intermediate element;
      a second elastic body configured to transfer the torque between the first intermediate element and the output;
      a third elastic body configured to transfer the torque between the input and the second intermediate element;
      a fourth elastic body configured to transfer the torque between the second intermediate element and the output; and
      a fifth elastic body configured to transfer the torque between the first intermediate element and the second intermediate element,
   the third and fourth elastic bodies are disposed on an outer side of the first and second elastic bodies in a radial direction of the damper apparatus, and
   the fifth elastic body is disposed on the outer side of the first and second elastic bodies in the radial direction so as to be closer to the turbine runner than the first, second, third, and fourth elastic bodies in an axial direction of the damper apparatus.

13. The starting apparatus according to claim 12, wherein the fifth elastic body is disposed on an inner side of the third and fourth elastic bodies in the radial direction.

14. The starting apparatus according to claim 12, wherein the third and fourth elastic bodies are disposed so as to at least partially overlap at least one of the first and second elastic bodies in the axial direction as viewed in the radial direction.

15. The starting apparatus according to claim 12, wherein the fifth elastic body is disposed so as to at least partially overlap at least one of the first and second elastic bodies in the axial direction as viewed in the radial direction.

16. The starting apparatus according to claim 12, wherein the fifth elastic body is disposed so as to at least partially overlap the turbine runner in the radial direction as viewed in the axial direction.

17. The starting apparatus according to claim 12, wherein
the first and second elastic bodies are disposed on an inner side in the radial direction with respect to a maximally bulging portion in the axial direction, and
the third and fourth elastic bodies are disposed on an outer side in the radial direction with respect to the maximally bulging portion of the turbine runner.

18. The starting apparatus according to claim 12, further comprising a multi-plate lock-up clutch, wherein
the third and fourth elastic bodies are disposed so as to at least partially overlap a part of the lock-up clutch in the axial direction as viewed in the radial direction.

19. The starting apparatus according to claim 12, further comprising a multi-plate lock-up clutch, wherein
the first and second elastic bodies are disposed so as to at least partially overlap a friction engagement portion of the lock-up clutch in the radial direction as viewed in the axial direction, and
the third and fourth elastic bodies are disposed on an outer side in the radial direction with respect to the friction engagement portion.

20. The starting apparatus according to claim 12, further comprising a single-plate lock-up clutch, wherein
the first and second elastic bodies are disposed on an inner side in the radial direction with respect to a friction engagement portion of the lock-up clutch, and
the third and fourth elastic bodies are disposed so as to at least partially overlap the friction engagement portion in the radial direction as viewed in the axial direction.

* * * * *